United States Patent
Bui et al.

(10) Patent No.: US 12,531,035 B2
(45) Date of Patent: Jan. 20, 2026

(54) USER-PRESENCE BASED ADJUSTMENT OF DISPLAY CHARACTERISTICS

(71) Applicant: Intel Corporation, Santa Clara, CA (US)

(72) Inventors: Kathy Bui, Hillsboro, OR (US); Paul Diefenbaugh, Portland, OR (US); Marko Bartscherer, Cornelius, OR (US); Aleksander Magi, Portland, OR (US); Nisha Aram, Hillsboro, OR (US); Zhongsheng Wang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 935 days.

(21) Appl. No.: 17/359,116

(22) Filed: Jun. 25, 2021

(65) Prior Publication Data

US 2021/0327394 A1    Oct. 21, 2021

(51) Int. Cl.
*G09G 5/10* (2006.01)
*G06F 3/01* (2006.01)
*G06V 40/16* (2022.01)

(52) U.S. Cl.
CPC .............. *G09G 5/10* (2013.01); *G06F 3/012* (2013.01); *G06V 40/161* (2022.01);
(Continued)

(58) Field of Classification Search
CPC ................ G09G 5/10; G09G 2354/00; G09G 2360/141; G09G 2360/145;
(Continued)

(56) References Cited

U.S. PATENT DOCUMENTS 1,010,187 A   11/1911  Scott
5,173,940 A   12/1992  Lantz et al.
(Continued)

FOREIGN PATENT DOCUMENTS

CN    102197349 A    9/2011
CN    102231255 A    11/2011
(Continued)

OTHER PUBLICATIONS

International Searching Authority, "International Preliminary Report on Patentability," issued in connection with International Patent Application No. PCT/US2022/022196, issued on Dec. 14, 2023, 2 pages.

(Continued)

*Primary Examiner* — Chanh D Nguyen
*Assistant Examiner* — Gloryvid Figueroa-Gibson
(74) *Attorney, Agent, or Firm* — Hanley, Flight & Zimmerman, LLC

(57) ABSTRACT

Methods, apparatus, systems, and articles of manufacture for applying selective adjustment of displays are disclosed herein. An example apparatus to control an operating characteristic such as a brightness of a display of an electronic device includes a face analyzer to identify a presence of a face of a user relative to the device based on image data generated by an image sensor of the electronic device, and a correlation analyzer to determine a correlation of the detected presence and a first device interaction event. In response to the correlation, the correlation analyzer is to apply a display brightness adjustment rule to selectively adjust the brightness of the display from a first setting to a second setting after a first time interval.

25 Claims, 7 Drawing Sheets

(52) U.S. Cl.
CPC ... *G09G 2354/00* (2013.01); *G09G 2360/141* (2013.01); *G09G 2360/145* (2013.01); *G09G 2360/16* (2013.01)

(58) Field of Classification Search
CPC ....... G09G 2360/16; G09G 2320/0633; G09G 2330/021; G06F 3/012; G06F 3/013; G06V 40/161; G06V 40/16
See application file for complete search history.

(56) References Cited

U.S. PATENT DOCUMENTS

| | | |
|---|---|---|
| 5,835,083 A | 11/1998 | Nielsen |
| 6,657,647 B1 | 12/2003 | Bright |
| 6,760,649 B2 | 7/2004 | Cohen |
| 7,386,799 B1 | 6/2008 | Clanton et al. |
| 7,559,034 B1 | 7/2009 | Paperny et al. |
| 7,725,547 B2 | 5/2010 | Albertson et al. |
| 7,971,156 B2 | 6/2011 | Albertson et al. |
| 8,139,032 B2 | 3/2012 | Su et al. |
| 8,566,696 B1 | 10/2013 | Hamon et al. |
| 8,581,974 B2 | 11/2013 | Lin et al. |
| 8,717,318 B2 | 5/2014 | Anderson et al. |
| 8,812,831 B2 | 8/2014 | Cheng et al. |
| 8,954,884 B1 | 2/2015 | Barger |
| 8,994,487 B2 | 3/2015 | Chen et al. |
| 9,268,434 B2 | 2/2016 | Sultenfuss et al. |
| 9,311,909 B2 | 4/2016 | Giaimo, III et al. |
| 9,436,241 B2 | 9/2016 | Tang et al. |
| 9,575,559 B2 | 2/2017 | Andrysco |
| 9,721,383 B1 | 8/2017 | Horowitz et al. |
| 9,740,290 B2 | 8/2017 | Rosenberg et al. |
| 9,766,700 B2 | 9/2017 | Lyons et al. |
| 9,785,234 B2 | 10/2017 | Horesh |
| 9,846,471 B1 | 12/2017 | Arora |
| 9,936,195 B2 | 4/2018 | Horesh |
| 9,996,638 B1 | 6/2018 | Holz et al. |
| 10,234,928 B2 | 3/2019 | Chen |
| 10,254,178 B2 | 4/2019 | Carbone et al. |
| 10,262,599 B2 | 4/2019 | Lang et al. |
| 10,304,209 B2 | 5/2019 | Alonso |
| 10,415,286 B1 | 9/2019 | Porcella et al. |
| 10,551,888 B1 | 2/2020 | North et al. |
| 10,620,457 B2 | 4/2020 | Ain-Kedem |
| 10,620,786 B2 | 4/2020 | Veeramani et al. |
| 10,725,510 B2 | 7/2020 | Ho et al. |
| 10,740,912 B2 | 8/2020 | Ren et al. |
| 10,768,724 B1 | 9/2020 | Han |
| 10,819,920 B1 | 10/2020 | Hamlin et al. |
| 10,884,479 B2 | 1/2021 | Chen |
| 11,153,472 B2 | 10/2021 | Konicek |
| 11,194,398 B2 | 12/2021 | Bernhart |
| 11,360,528 B2 | 6/2022 | Mishra et al. |
| 11,379,016 B2 | 7/2022 | Cooper et al. |
| 11,543,873 B2 | 1/2023 | Sengupta et al. |
| 11,733,761 B2 | 8/2023 | Sinha et al. |
| 11,782,488 B2 | 10/2023 | Cooper et al. |
| 11,809,535 B2 | 11/2023 | Magi et al. |
| 2002/0089190 A1 | 7/2002 | Wang et al. |
| 2002/0091738 A1 | 7/2002 | Rohrabaugh et al. |
| 2003/0043174 A1 | 3/2003 | Hinckley et al. |
| 2003/0174149 A1 | 9/2003 | Fujisaki et al. |
| 2004/0158739 A1 | 8/2004 | Wakai et al. |
| 2004/0175020 A1 | 9/2004 | Bradski et al. |
| 2004/0252101 A1 | 12/2004 | Wilk |
| 2005/0071698 A1 | 3/2005 | Kangas |
| 2006/0146030 A1 | 7/2006 | Kim |
| 2006/0192775 A1 | 8/2006 | Nicholson et al. |
| 2007/0228138 A1 | 10/2007 | Huang et al. |
| 2008/0046425 A1 | 2/2008 | Perski |
| 2008/0112571 A1 | 5/2008 | Bradicich et al. |
| 2008/0158144 A1 | 7/2008 | Schobben et al. |
| 2008/0301300 A1 | 12/2008 | Toub |
| 2009/0092293 A1 | 4/2009 | Lin |
| 2009/0165125 A1 | 6/2009 | Brown et al. |
| 2010/0039376 A1 | 2/2010 | Wang |
| 2010/0079508 A1 | 4/2010 | Hodge et al. |
| 2010/0100716 A1 | 4/2010 | Scott |
| 2010/0281432 A1 | 11/2010 | Geisner et al. |
| 2010/0295839 A1 | 11/2010 | Nagaya |
| 2011/0055752 A1 | 3/2011 | Rubinstein et al. |
| 2011/0154266 A1 | 6/2011 | Friend et al. |
| 2011/0175932 A1 | 7/2011 | Yu et al. |
| 2011/0221871 A1* | 9/2011 | Sakaniwa ............ H04N 13/139 348/51 |
| 2011/0248918 A1 | 10/2011 | Yoo et al. |
| 2011/0251733 A1 | 10/2011 | Atkinson |
| 2011/0252339 A1 | 10/2011 | Lemonik et al. |
| 2011/0273546 A1 | 11/2011 | Lin et al. |
| 2011/0296163 A1 | 12/2011 | Abernethy et al. |
| 2011/0298702 A1 | 12/2011 | Sakata et al. |
| 2011/0298967 A1 | 12/2011 | Clavin et al. |
| 2012/0032894 A1 | 2/2012 | Parivar et al. |
| 2012/0054670 A1 | 3/2012 | Rainisto |
| 2012/0062470 A1 | 3/2012 | Chang |
| 2012/0123680 A1 | 5/2012 | Wipplinger et al. |
| 2012/0171656 A1 | 7/2012 | Shen |
| 2012/0172085 A1 | 7/2012 | Vuppu et al. |
| 2012/0249429 A1 | 10/2012 | Anderson et al. |
| 2012/0268893 A1 | 10/2012 | Yin |
| 2012/0300061 A1 | 11/2012 | Osman et al. |
| 2012/0319997 A1 | 12/2012 | Majumder |
| 2013/0007096 A1 | 1/2013 | Pahlavan et al. |
| 2013/0007590 A1 | 1/2013 | Rivera et al. |
| 2013/0021750 A1 | 1/2013 | Senatori |
| 2013/0080807 A1* | 3/2013 | Theocharous .... H04W 52/0258 713/320 |
| 2013/0120460 A1 | 5/2013 | Adams et al. |
| 2013/0158999 A1 | 6/2013 | Maruta et al. |
| 2013/0173946 A1 | 7/2013 | Rotem et al. |
| 2013/0174016 A1 | 7/2013 | Glazer et al. |
| 2013/0185633 A1 | 7/2013 | Bunker et al. |
| 2013/0207895 A1 | 8/2013 | Lee |
| 2013/0212462 A1 | 8/2013 | Athas et al. |
| 2013/0222329 A1 | 8/2013 | Larsby et al. |
| 2013/0283213 A1 | 10/2013 | Guendelman et al. |
| 2013/0289792 A1 | 10/2013 | Cheng et al. |
| 2013/0321265 A1 | 12/2013 | Bychkov et al. |
| 2013/0321271 A1 | 12/2013 | Bychkov et al. |
| 2013/0332760 A1 | 12/2013 | Reece et al. |
| 2014/0006830 A1 | 1/2014 | Kamhi et al. |
| 2014/0028548 A1 | 1/2014 | Bychkov et al. |
| 2014/0050360 A1 | 2/2014 | Lin et al. |
| 2014/0085451 A1 | 3/2014 | Kamimura et al. |
| 2014/0089865 A1 | 3/2014 | Gay et al. |
| 2014/0129937 A1 | 5/2014 | Jarvinen et al. |
| 2014/0132508 A1 | 5/2014 | Hodge |
| 2014/0139456 A1 | 5/2014 | Wigdor et al. |
| 2014/0149935 A1 | 5/2014 | Johnson et al. |
| 2014/0189579 A1 | 7/2014 | Rimon et al. |
| 2014/0191995 A1 | 7/2014 | Karpin et al. |
| 2014/0201690 A1 | 7/2014 | Holz |
| 2014/0208260 A1 | 7/2014 | Kawahara et al. |
| 2014/0258942 A1 | 9/2014 | Kutliroff et al. |
| 2014/0267021 A1 | 9/2014 | Lee et al. |
| 2014/0267034 A1 | 9/2014 | Krulce |
| 2014/0281918 A1 | 9/2014 | Wei et al. |
| 2014/0313120 A1 | 10/2014 | Kamhi |
| 2014/0344599 A1 | 11/2014 | Branover |
| 2014/0361977 A1 | 12/2014 | Stafford et al. |
| 2014/0372511 A1 | 12/2014 | Kapadia et al. |
| 2014/0379340 A1 | 12/2014 | Timem |
| 2014/0380075 A1 | 12/2014 | Pulapaka et al. |
| 2015/0009238 A1 | 1/2015 | Kudalkar |
| 2015/0015688 A1 | 1/2015 | Yang |
| 2015/0042572 A1 | 2/2015 | Lombardi et al. |
| 2015/0058649 A1 | 2/2015 | Song et al. |
| 2015/0100884 A1 | 4/2015 | Ryu et al. |
| 2015/0121193 A1 | 4/2015 | Beveridge et al. |
| 2015/0121287 A1 | 4/2015 | Fermon |
| 2015/0177843 A1 | 6/2015 | Kwon |
| 2015/0185909 A1 | 7/2015 | Gecnuk |
| 2015/0193395 A1 | 7/2015 | Nicoaou et al. |
| 2015/0198991 A1 | 7/2015 | Bircher |

(56) References Cited

U.S. PATENT DOCUMENTS

| | | |
|---|---|---|
| 2015/0220149 A1 | 8/2015 | Plagemann et al. |
| 2015/0220150 A1 | 8/2015 | Plagemann et al. |
| 2015/0248167 A1 | 9/2015 | Turbell et al. |
| 2015/0264572 A1 | 9/2015 | Turgeman |
| 2015/0360567 A1 | 12/2015 | Sannomiya et al. |
| 2015/0363070 A1 | 12/2015 | Katz |
| 2015/0378443 A1 | 12/2015 | Luo |
| 2015/0378748 A1 | 12/2015 | Cheng |
| 2016/0034019 A1 | 2/2016 | Seo et al. |
| 2016/0055825 A1 | 2/2016 | Lee |
| 2016/0062584 A1 | 3/2016 | Cohen et al. |
| 2016/0087981 A1 | 3/2016 | Dorresteijn |
| 2016/0091938 A1 | 3/2016 | Edwards et al. |
| 2016/0109961 A1 | 4/2016 | Parshionikar |
| 2016/0116960 A1 | 4/2016 | Kwak et al. |
| 2016/0132099 A1 | 5/2016 | Grabau et al. |
| 2016/0165544 A1 | 6/2016 | Pefkianakis et al. |
| 2016/0170617 A1 | 6/2016 | Shi et al. |
| 2016/0179767 A1 | 6/2016 | Mavinakuli et al. |
| 2016/0180762 A1 | 6/2016 | Batiche et al. |
| 2016/0187994 A1 | 6/2016 | La et al. |
| 2016/0202750 A1 | 7/2016 | Pulapaka et al. |
| 2016/0212137 A1 | 7/2016 | Alameh et al. |
| 2016/0232701 A1 | 8/2016 | Drozdyuk |
| 2016/0259467 A1 | 9/2016 | Nayyar et al. |
| 2016/0297362 A1 | 10/2016 | Tijerina et al. |
| 2016/0335989 A1* | 11/2016 | Ooi ................ G06V 40/161 |
| 2016/0370860 A1 | 12/2016 | Bychkov et al. |
| 2017/0010654 A1 | 1/2017 | Chen |
| 2017/0018234 A1 | 1/2017 | Na |
| 2017/0034146 A1 | 2/2017 | Sugaya |
| 2017/0039170 A1 | 2/2017 | Tunali et al. |
| 2017/0039480 A1 | 2/2017 | Bitran et al. |
| 2017/0045936 A1 | 2/2017 | Kakapuri |
| 2017/0085790 A1 | 3/2017 | Bernhart |
| 2017/0201254 A1 | 7/2017 | Hassen et al. |
| 2017/0219240 A1 | 8/2017 | Cassini et al. |
| 2017/0269725 A1 | 9/2017 | Kang |
| 2017/0321856 A1 | 11/2017 | Keates |
| 2018/0039410 A1 | 2/2018 | Kim et al. |
| 2018/0039990 A1 | 2/2018 | Lindemann |
| 2018/0136719 A1 | 5/2018 | Chen |
| 2018/0157815 A1 | 6/2018 | Salama et al. |
| 2018/0164942 A1 | 6/2018 | Huffman et al. |
| 2018/0166076 A1 | 6/2018 | Higuchi et al. |
| 2018/0188774 A1 | 7/2018 | Ent et al. |
| 2018/0188803 A1 | 7/2018 | Sharma et al. |
| 2018/0189547 A1 | 7/2018 | Daniels et al. |
| 2018/0224871 A1 | 8/2018 | Sahu et al. |
| 2018/0321731 A1 | 11/2018 | Alfano et al. |
| 2018/0373292 A1 | 12/2018 | Perelli |
| 2019/0004764 A1 | 1/2019 | Son et al. |
| 2019/0034609 A1 | 1/2019 | Yang et al. |
| 2019/0079572 A1 | 3/2019 | Yamamoto |
| 2019/0129473 A1 | 5/2019 | Hu et al. |
| 2019/0147875 A1 | 5/2019 | Stemmer et al. |
| 2019/0155364 A1 | 5/2019 | Chen |
| 2019/0155368 A1 | 5/2019 | Branover |
| 2019/0174419 A1 | 6/2019 | Schillings et al. |
| 2019/0213309 A1 | 7/2019 | Morestin |
| 2019/0236390 A1 | 8/2019 | Guo et al. |
| 2019/0239384 A1 | 8/2019 | North et al. |
| 2019/0250691 A1 | 8/2019 | Lee et al. |
| 2019/0258785 A1 | 8/2019 | Alameh et al. |
| 2019/0265831 A1 | 8/2019 | Sinnott et al. |
| 2019/0278339 A1 | 9/2019 | Cooper et al. |
| 2019/0361501 A1 | 11/2019 | Park et al. |
| 2019/0371326 A1 | 12/2019 | Bocklet et al. |
| 2019/0371342 A1 | 12/2019 | Tukka et al. |
| 2020/0012331 A1 | 1/2020 | de Cesare et al. |
| 2020/0026342 A1 | 1/2020 | Sengupta et al. |
| 2020/0026896 A1 | 1/2020 | Debates |
| 2020/0033920 A1 | 1/2020 | Nielsen et al. |
| 2020/0092817 A1 | 3/2020 | Bai |
| 2020/0125158 A1 | 4/2020 | Giusti et al. |
| 2020/0125179 A1 | 4/2020 | Okuley |
| 2020/0133358 A1 | 4/2020 | Mishra et al. |
| 2020/0133374 A1* | 4/2020 | Sinha ................ G06F 3/013 |
| 2020/0134151 A1 | 4/2020 | Magi et al. |
| 2020/0142471 A1 | 5/2020 | Azam |
| 2020/0175944 A1 | 6/2020 | Sun et al. |
| 2020/0213501 A1 | 7/2020 | Sohn |
| 2020/0259638 A1 | 8/2020 | Carmignani et al. |
| 2020/0348745 A1 | 11/2020 | Hamlin et al. |
| 2021/0025976 A1 | 1/2021 | Chandel et al. |
| 2021/0096237 A1 | 4/2021 | Patole et al. |
| 2021/0109585 A1 | 4/2021 | Fleming et al. |
| 2021/0136130 A1* | 5/2021 | Ponnusamy ........ H04L 12/1822 |
| 2021/0240254 A1 | 8/2021 | Hamlin et al. |
| 2021/0318743 A1 | 10/2021 | Partiwala et al. |
| 2021/0327394 A1 | 10/2021 | Bui et al. |
| 2022/0060572 A1 | 2/2022 | Kwon |
| 2022/0245229 A1 | 8/2022 | Zhang |
| 2022/0350385 A1 | 11/2022 | Mishra et al. |
| 2023/0205307 A1 | 6/2023 | Han et al. |
| 2023/0298281 A1* | 9/2023 | Pease ................ G06F 3/012 |
| | | 345/633 |

FOREIGN PATENT DOCUMENTS

| | | |
|---|---|---|
| CN | 107077184 A | 8/2017 |
| CN | 108958447 A | 12/2018 |
| CN | 112558056 A | 3/2021 |
| EP | 2518586 A1 | 10/2012 |
| EP | 2830366 A1 | 1/2015 |
| EP | 3285133 A1 | 2/2018 |
| JP | H0651901 A | 2/1994 |
| JP | 10-240389 A | 9/1998 |
| JP | 2001255854 A | 9/2001 |
| JP | 2002071833 A | 3/2002 |
| JP | 2005221907 A | 8/2005 |
| JP | 2010060746 A | 3/2010 |
| JP | 2010271339 A | 12/2010 |
| JP | 2011137874 A | 7/2011 |
| JP | 2016517087 A | 6/2016 |
| KR | 20130093962 | 8/2013 |
| KR | 20130093962 A | 8/2013 |
| KR | 20150022673 A | 3/2015 |
| KR | 20180029370 A | 3/2018 |
| KR | 20190027930 A | 3/2019 |
| WO | 2010071631 A1 | 6/2010 |
| WO | 201413118 A1 | 9/2014 |
| WO | 2014186294 A1 | 11/2014 |
| WO | 2014205227 A2 | 12/2014 |
| WO | 2015026203 A1 | 2/2015 |
| WO | 2020191643 A1 | 10/2020 |
| WO | 2021258395 A1 | 12/2021 |

OTHER PUBLICATIONS

GSMArena team, "Samsung Galaxy Fold review," GSMArena, dated Apr. 26, 2019, retrieved from https://www.Jsmarena.com/samsung_galaxy_fold-review-1926p4.php on Jun. 8, 2023, 8 pages.

Samsung, "Samsung Galaxy Fold Now Available," Samsung Global Newsroom, dated Sep. 5, 2019, retrieved rom https://news.samsung.com/global/samsung-galaxy-fold-now-available) on Jun. 8, 2023, 7 pages.

GSMArena team, "Samsung Galaxy Fold long-term review," GSMArena, dated Nov. 9, 2019, retrieved from https://www.gsmarena.com/samsung_galaxy_fold_long_term-review-1996p7.php on Jun. 8, 2023, 8 pages.

Chethan, "Proximity Sensing with CapSense," Cypress AN92239, 2016, 62 pages.

Cutress, Ian "Asus ZenTechBook Pro 15(UX580); A 5.5-inch Screen in the Touchpad", retrieved from https://anandtech.com/show/12880/asus-zenbook-pro-15-ux580-a-55inch-screen-in-the-touchpad, Jun. 5, 2018.

Gajitz, "Open Sesame Gesture-Motorized Laptop Lid", available at https://gajitz.com/open-sesame-gesture-controlled-motorized-laptop-lid/ (retrieved May 6, 2019), Sep. 2012, 3 pages.

(56) References Cited

OTHER PUBLICATIONS

Indiegogo, "Cosmo Communicator", available at https://www.indiegogo.com/projects/cosmo-communicator# (retrieved May 6, 2019), 2018, 18 pages.

"Jack Purcher, ""Google Patents a Motorized Pixelbook Lid that Opens and Closes with a Simple Touch & Auto-Aligns the Display to the user's Face""", Patently Mobile, available at https"//www.patentlymobile.com/2017/11/gogole-patents-a-motorized-pixelbook-lid-that-opens-and-closes-with-a-simple-touch-auto-aligns-the-display-to-the-users-fa.html (retrieved May 6, 2019), Nov. 25, 2017, 6 pages.

Kul Bushan, "CES 2019_Dell's new laptop can sense your presence and wake itself" Hindustan Times, available at https://www.hindustantimes.com/tech/ces-2019-dell-latitude-7400-2-in-1-laptop-launched-price-specifications-features/story-CiRoU1GoHHsHq3K3qtPZWJ.html (retrieved May 6, 2019),Jan. 5, 2019, 6 pages.

Monica Chin, "Alexa on Windows 10 Hands-On: Useful, with 1 Big Catch", Laptop Magazine, available at https://www.laptopmag.com/articles/alexa-windows-10-hands-on (retrieved May 6, 2019), Nov. 14, 2018, 6 pages.

Notebook Review, "CES 2007: Vista SideShow in HP, Fujitsu, LG and Asus Notebooks," Notebook Review, available at www.notebookreview.com/news/ces-2007-vista-sideshow-in-hp-fujitsu-and-asus-noteboks/ (retrieved May 6, 2019), Jan. 8, 2007, 8 pages.

Nvidia "PDK User's Guide: Prefaced Personal Media Device," Manual, published Sep. 4, 2007, 39 pages.

Nvidia, "Nvidia and Asus Deliver World's First Notebook with Windows Sideshow Secondary Display," Press Release, available at https:www.nvidia.com/object/IO_38772.html (retrieved May 6, 2019), Jan. 8, 2007, 5 pages.

Nvidia, "Nvidia Preface Platform Enables Windows Vista on the Go," Press Release, available at https://www.nvidia.com/object/IO_38775.html (retrieved May 6, 2019), Jan. 8, 2007, 5 pages.

Cravotta, Nicholas, "Optimizing Proximity Sensing for Consumer Electronics Applications," Digi-Key Electronics, Apr. 26, 2012, 9 pages.

Pradeep, Dell's new Latitude 7400 2-in-1 can detect your presence and automatically wake the system, MSPoweruser, Sep. 18, 2019, 20 pages.

International Searching Authority, "International Search Report and Written Opinion," issued in connection with International Patent Application No. PCT/US2022/022196, dated Jun. 30, 2022, 10 pages.

European Patent Office, "Supplementary European Search Report," issued in connection with European Patent Application No. 22828946.8, dated Mar. 12, 2025, 8 pages.

\* cited by examiner

| CORRELATION RULE(S) 318 | | |
|---|---|---|
| | USER DETECTED 400 | USER *NOT* DETECTED 402 |
| USER INTERACTION EVENT(S) DETECTED 404 | + CORRELATION 408 | - CORRELATION 410 |
| *NO* USER INTERACTION EVENT(S) DETECTED 406 | - CORRELATION 412 | - CORRELATION 414 |

FIG. 4

USER-PRESENCE BASED ADJUSTMENT OF DISPLAY CHARACTERISTICS

FIELD OF THE DISCLOSURE

This disclosure relates generally to displays of electronic devices, and, more particularly, to user-presence based adjustment of display characteristics.

BACKGROUND

A display panel of an electronic user device (e.g., a personal computer, a smartphone, a tablet) enables a user to view and interact with graphical content. The user device includes a display screen and one or more user input devices (e.g., a mouse, a keyboard, a trackpad). The display panel includes panel electronics that control the display of the content via the display screen and a backlight that illuminates the display screen for ease of viewing by the user. During operation of the user device, the backlight and panel electronics of the display panel consume power. In some examples, the brightness of the backlight can be adjusted.

BRIEF DESCRIPTION OF THE DRAWINGS

FIG. 4 is a table of correlation rules as implemented by the example correlation analyzer of FIG. 3.

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Figure 1:
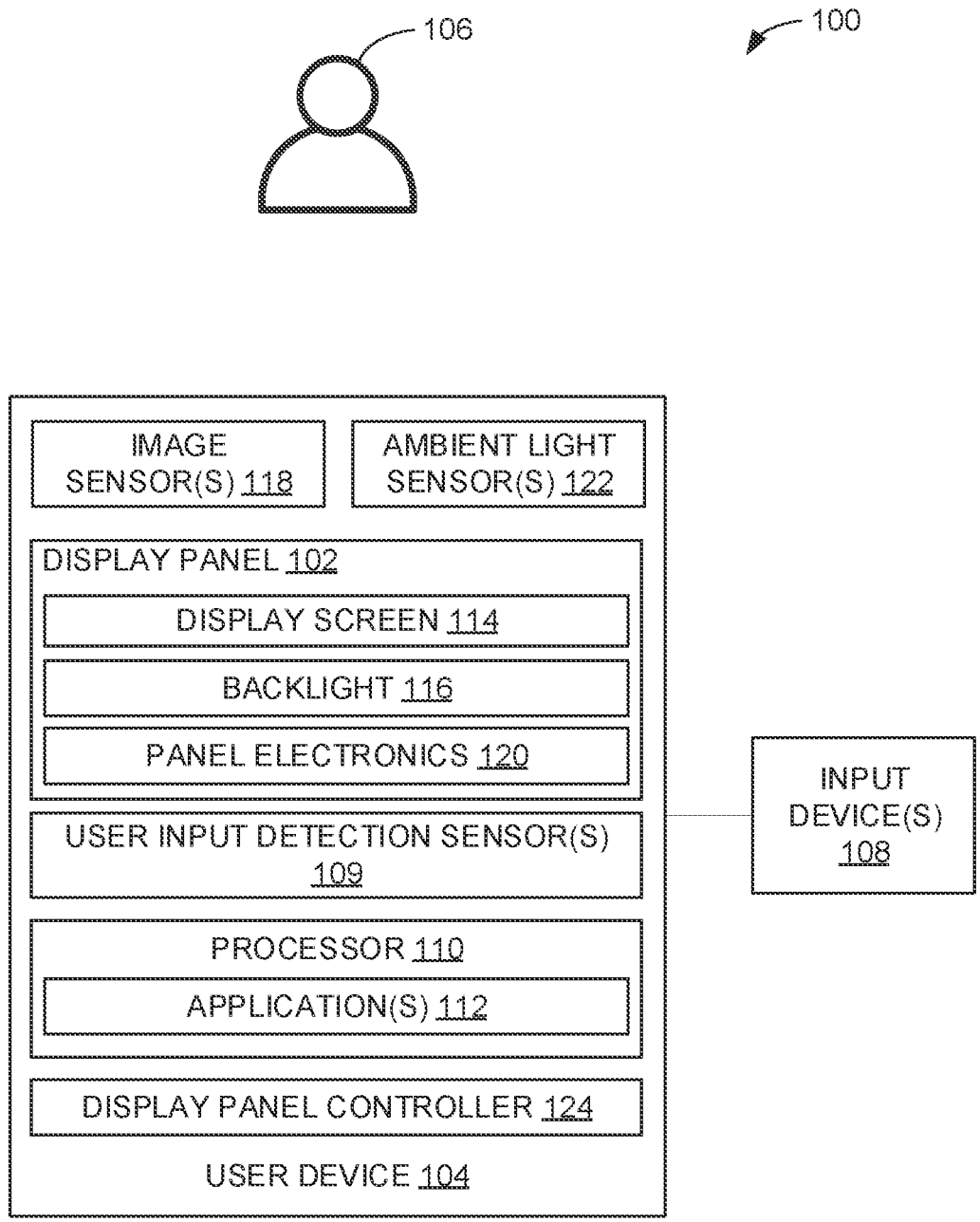
FIG. 1 is an example system for user-presence based adjustment of display characteristics of a user device in accordance with the teachings of this disclosure.

A display panel of an electronic user device (e.g., a personal computer, a laptop, a smartphone, a tablet) enables a user to view and/or interact with graphical content via a display screen. The user can interact with the graphical content by one or more input devices, such as, for example, a mouse, a keyboard, and/or a touchscreen. The display panel includes panel electronics to control the display of the graphical content as well as display panel controllers to adjust display characteristics such as, for example, backlight or illumination of the display screen as the device is operated. As such, the panel electronics and display panel controllers consume power as the device is in an operative state (e.g., powered-on mode) to provide output data (e.g., an image, a video, etc.) on the display screen.

During operation of the device, the display panel consumes power to output data for display and illuminate the display screen, even when the user is not viewing the display screen. For example, the user may turn away or avert his or her gaze from the display screen to talk to a person, use another device, or may step away from the user device for a period of time (e.g., an hour, overnight, etc.) without powering off the device. In such instances, the panel electronics of the display panel continue to illuminate the backlight of the display screen. In some examples, power consumption of the display panel can represent relatively large portion (e.g., 30%-40%) of a total power consumption of the user device and, thus, can affect, for instance, a life of a battery of the user device.

To reduce power consumption of the user device when the device is not being actively used by the user, the display panel may gradually dim or automatically turn off the backlight after a period of time (e.g., 30 seconds, 5 minutes, 10 minutes, etc.) in which no user inputs are detected (e.g., a timeout period). In some examples, the display panel is turned off as the device enters a low-power, sleep or hibernation mode after a period of user inactivity. However, in some examples, the user device may not accurately determine if a user is using device without user input from an input device such as a keyboard, a mouse, a trackpad, or a touch-screen. Also, in some devices, the timeout period for causing the display panel to move to the low power state and begin dimming the display screen is predetermined by the manufacturer of the device. In some examples, the predetermined timeout periods cannot be dynamically adjusted, and the timeout periods may be too short or too long to effectively conserve power. For example, a display panel timeout period that is too short may increase overall power consumption of the device and is ineffective because the short timeout period likely causes the user to repeatedly take actions to cause the display panel to return to an active state even when the user has not engaged with the device for a brief period of time. In contrast, a timeout period that is too long can result in missed opportunities for conserving power when the user is in fact no longer engaging with or using the device.

In some examples, reduced power consumption is correlated with user presence. User presence may be determined through face detection and/or head orientation detection sensors and/or algorithms. Face detection or head orientation detection sensors and/or algorithms integrated into user devices enable user devices to adjust backlight (e.g., dim) of the display screen in response to a detection that the user is no longer present in the environment of the device, no longer oriented or facing the direction of the device, and/or no longer maintaining his or her gaze on the display screen. However, accuracy of these algorithms is dependent on a Field-of-View (FoV) of an imaging sensor(s) (e.g., a camera), limiting performance and accuracy of when the backlight is adjusted. For example, an algorithm may cause adjustment or dimming of the backlight of a display screen even though the user is actively looking at the device because the user may be outside of the imaging sensor FoV. Current solutions rely solely on image sensor(s) with known inaccuracies to identify user presence. For example, limitations such as variability in user position or orientation of the head or face, location of the user outside of the imaging sensor(s) FoV and lighting conditions introduce error to the efficacy of such detection algorithms. As a result, even with integrated user-presence algorithms, a backlight of a display screen can still dim prematurely even if a user is present or averting his or her gaze away from the image sensor(s) for a period of time. Thus, a need exists for the application of display screen dimming at a higher accuracy to prevent dimming unless the user is disengaged or not present.

FIG. 1 illustrates an example system 100 constructed in accordance with teachings of this disclosure for user-presence based adjustment of displays characteristics. In some examples, the system 100 determines conditions for controlled dimming of a display panel 102 of a user device 104 based on interaction of a user or subject 106. In the examples disclosed herein, the terms "user" and "subject" are used interchangeably herein. In some examples, the system 100 can control other operating characteristics of the display panel 102 such as, for example, a display refresh rate, and/or other characteristics of the user device 104 including, for example, a volume, a fan speed, etc. In some examples, the user device 104 is an electronic device such as, for example, a personal computer, a laptop, a tablet, a smart phone, etc. The user 106 can interact with the user device 104 via one or more input devices 108 (e.g., a mouse, a touchpad, a touchscreen, a keyboard, a microphone, etc.). For example, when the display screen 114 is a touchscreen, the user 106 can provide inputs to the display screen 114 via touch using his or her fingers, a stylus, etc. The example user device 104 also includes one or more user input detection sensors 109 in communication with the one or more input devices 108 to collect data associated with the one or more input devices 108 (e.g., a click, a hover, a scroll, a movement in a mouse, a touch of a key on a keyboard, a voice activation, etc.) to indicate user activity or interaction with the user device 104. In some examples, the user input detection sensor(s) 109 transmit data indicative of user activity or inactivity to a processor 110 for analysis and/or other processing.

In some examples, the user 106 interacts with the user device 104 by accessing one or more applications 112 (e.g., a web browser, a video player, a music streaming platform, a word processing application, etc.) executed by a processor 110 of the user device 104. The user 106 can view digital content associated with the one or more applications 112 (e.g., digital images, webpages, videos, electronic documents, etc.) via a display screen 114. In some examples, the display screen 114 is coupled to the display panel 102 of the user device 104. In other examples, the display screen 114 is located on a peripheral device (e.g., a projected display, etc.). The display panel 102 includes a backlight 116 to illuminate the display screen 114 for viewing of the digital content associated with the one or more applications 112 by the user 106.

The example user device 104 of FIG. 1 includes one or more image sensor(s) 118 which provide means for generating image and/or video data. For example, the image sensor(s) gather image or video data associated with a user 106 or an object facing the display panel 102. In some examples, the image sensor(s) 118 include a front-facing camera coupled to the display panel 102 and/or other portions of the user device 104 (e.g., to a hinge of a laptop). In other examples, image sensor(s) are separate devices (e.g., cameras, etc.) mounted to the display panel 102 or other portions of the user device 104. As disclosed herein, the image sensor(s) 118 of FIG. 1 define an imaging field of view (FoV).

The example display panel 102 of FIG. 1 includes panel electronics 120, and/or a circuitry including hardware such as, for example, a timing controller to provide for the output of graphics via the display screen 114. During operation of the user device 104, the backlight 116 and the panel electronics 120 consumer power. Power consumption (e.g., wattage) can vary based on illumination the display screen 114, processing of the digital content generated by the one or more applications 112 for display via the display screen 114, or the number of input device(s) 108 connected to the user device 104. In some examples, the power consumption of the display panel 102 alone can represent a relatively large portion of a total power consumption of the user device 104.

In some examples, the processor 110 instructs the display panel 102 to turn off or adjust the backlight 116 the display screen 114 (e.g., dim) after a period of time, or timeout period, with no user input or user presence (e.g., 10 minutes, 15 minutes, etc.) based on the data generated by the user input detection sensor(s) 109 and/or data generated by the image sensor(s) 118. In some examples, the timeout period can be determined by a user setting or is predefined based on the user device 104. In other examples, after the timeout period without user activity or user 106 presence, the processor 110 causes the user device 104 to enter a sleep mode, or a low power mode of operation, and the display panel 102 to turn dim or off. However, the periods of time may not accurately reflect activity or inactivity with the user device 104 or presence or absence of the user 106 relative to the user device 104. For example, during a period of time the user 106 may not be looking at or positioned in a direction of the display screen 114 or is not present relative to the user device 104. This period of time may be shorter than the timeout period that triggers the processor 110 to adjust the backlight to dim or turn off the display screen 114. For example, during operation of the user device 104, the user 106 may change his or her orientation relative to the display screen 114, thus turning his or her gaze away from the display screen. In other examples, the user 106 may leave the imaging FoV by walking away from the user device 104 and returning the user device 104 after a period of time. Thus, the timeout periods in which the user 106 is inactive do not accurately reflect the periods of time in which the user 106 may not be attentive to the display screen 114 and/or in the presence of the user device 104. During these periods of time in which the user 106 is not paying attention to the display screen 114, the display panel 102 continues to consumer power by, for example, maintaining illumination of the display panel 102 via the backlight 116 even though user 106 has averted his or her gaze from the display screen 114 and/or has walked away from the user device 104.

The one or more ambient light sensor(s) 122 on the user device 104 in FIG. 1 measure illuminance within the surrounding environment in which the user device 104 is located. The ambient light sensor(s) 122 generate data indicative of light intensity. The data collected by the ambient light sensor(s) 122 can used by a display panel controller 124 to selectively dim the backlight 116 of the display screen 114. As such, the display panel controller 124 forms a means to selectively adjust power consumption of the display panel 102. For example, if data generated by the ambient light sensor(s) 122 indicates that the environment (e.g., a room, outdoors, etc.) is dark or dimly lit, the display panel controller 124 causes the backlight 116 to gradually dim or increase brightness. In other examples, the display panel controller 124 instructs the backlight 116 to selectively adjust brightness if the data of the ambient light sensor(s) 122 indicates that the environment is in a highly lit (e.g., in bright sunlight, a highly lit room, etc.).

In some examples, the display panel controller 124 can reduce power consumption by the user device 104 based on data from the user input detection sensor(s) 109. For example, the data collected from the user input detection sensor(s) 109 may indicate that the user 106 is actively engaged with the user device 104 (e.g., typing on a keyboard). In such instances, the display panel controller 124 instructs the backlight 116 to remain fully lit or to maintain a current level of brightness during the period of time of active engagement with the user device 104. Thus, the display panel controller 124 can reduce power consumption by instructing the image sensor(s) 118 not to generate or analyze image data with respect to the user's gaze or presence because active engagement with the user device 104 indicates that the user 106 is present and attentive to the user device 104 during that period of time. In other examples, the data collected from the user input detection sensor(s) 109 may indicate that the user 106 is not actively engaged with the user device 104 (e.g., not typing on a keyboard, not moving the mouse) for a period of time. In such examples, the display panel controller 124 may instruct the backlight 116 to dim the display screen 114 after the period of time.

In some examples, the display panel controller 124 instructs a rate of change of the brightness of the backlight 116. For example, in some examples, the display panel controller 124 instructs the backlight 116 to dim at an increasing or higher rate compared to other examples. For example, when the ambient light sensor(s) 122 indicate that user device 104 is in a bright environment, the backlight 116 may be brighter to aide user viewing of the display screen 114 than when the user device 104 is located in a darker environment. In such examples, when the data collected from the user input detection sensor(s) 109 indicates that the user 106 is not actively engaged with the user device 104, the display panel controller 124 instructs the backlight 116 to dim the display screen 114 more quickly than the display panel controller 124 would instruct the backlight to dim when the backlight is less bright such as when the user device 104 is in a darker environment.

The example display panel controller 124 can be implemented by the processor 110 user device 104, or by a different processor or processors. In some examples, at least a portion of the operations performed by the display panel controller 124 are implemented by processor(s) of the user device 104 as the user device 104 operates in a low power mode or ultra-low power mode, such as digital signal processor(s). In other examples, the display panel controller 124 is implemented by one or more cloud-based devices, such as one more servers, processors, and/or virtual machines located remotely from the user device 104. In other examples, a portion of the analysis performed by the display panel controller 124 is implemented by cloud-based devices and other parts of the analysis are implemented by local processor(s) or one or more user device(s).

Figure 2:
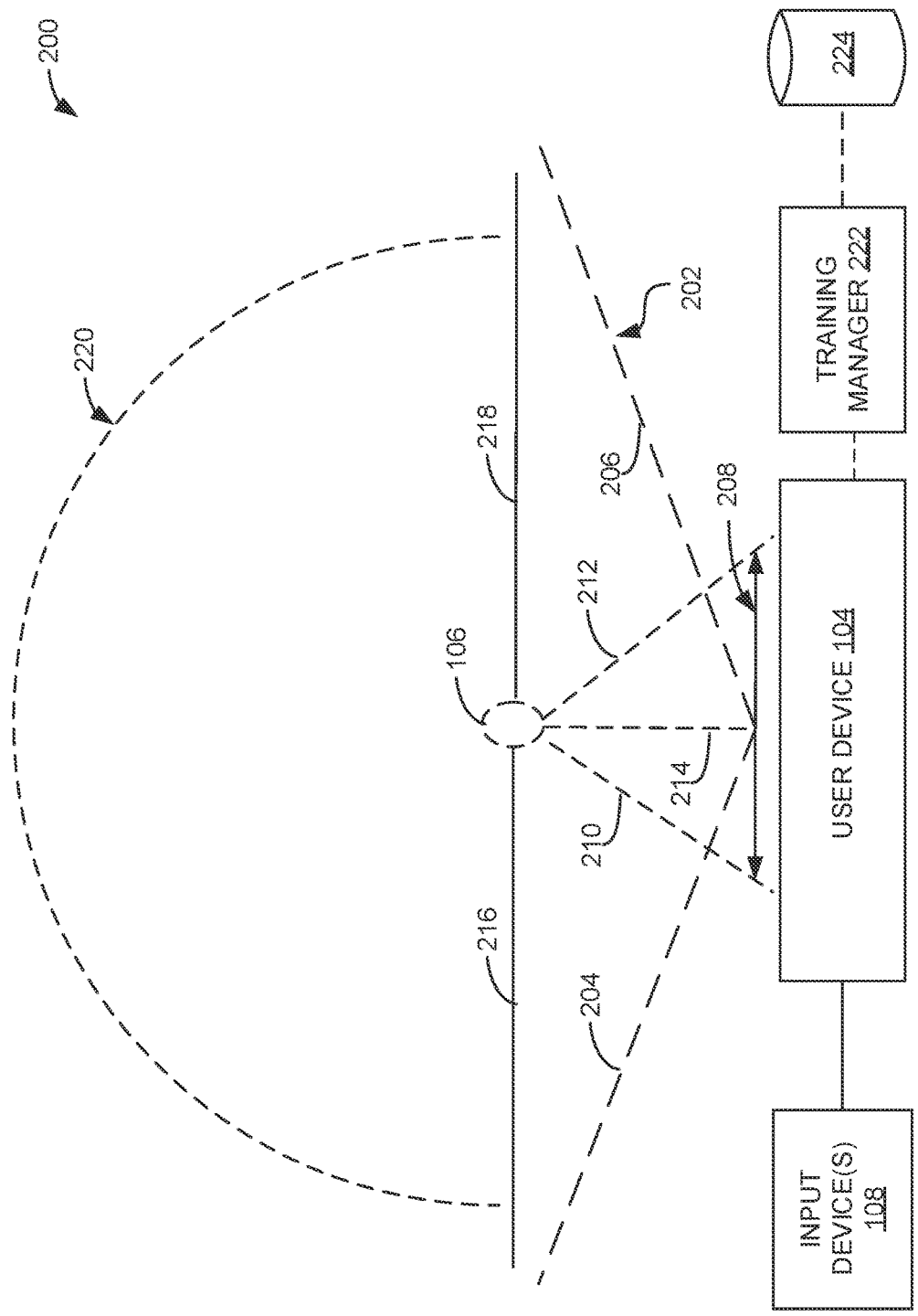
FIG. 2 is an imaging field of view (FoV) environment based on a front-facing camera image sensor of the user device of FIG. 1.

FIG. 2 illustrates an example imaging field of view (FoV) environment 200. The imaging FoV 202 is based on the image sensor(s) 118 of FIG. 1. The image sensor(s) 118 may include an example front-facing camera. In the example of FIG. 1, the image sensor(s) 118 are located at the top of the display panel 102 and are located in the center of the display panel 102. As such, the image sensor(s) 118 generate image data representing objects or the user 106 present within the imaging FoV 202. As shown in FIG. 2, the boundaries of the imaging FoV are illustrated by dashed lines 204 and 206 where the dashed line 204 defines a left FoV boundary 204 relative to the left side of the user device 104 or relative to the right-hand side of the user 106 facing the display panel 102. Similarly, as shown in FIG. 2, dashed line 206 defines a right FoV boundary 206 relative to the right side of the user device 104 or relative to the left-hand side of the user 106 facing the display panel 102. During operation of the user device 104, or while the user device 104 is in a powered-on mode, the user 106 may move between the left and right FoV boundaries 204, 206, respectively, and/or the user may walk away from the user device 104, thus leaving the imaging FoV. The image sensor(s) 118 generate image data for the user 106 when the user is within the left and right FoV boundaries 204, 206. In some examples, the image sensor(s) 118 generate image data even when the user device 104 is in a sleep mode.

In the example of FIG. 2, a display field of view (FoV) 208 associated with the display screen 114 is illustrated by left and right boundaries 210, 212. In some examples, the left display FoV boundary 210 is at an angle away (e.g., 45°) from the center of the display screen 114 relative to the user 106 located in front of the display screen 114 (e.g., a head turn of 45° to the right). Similarly, the right display FoV boundary 212 is at an angle away (e.g., 45°) from the center of the display screen 114 relative to the user 106 located in front of the display screen 114 (e.g., a head turn of 45° to the left). As such, the display FoV 208 is defined based on a distance of the user 106 away from the display screen 114 and a viewing angle of the user 106 relative to the display screen 114. In some examples, the viewing angle is a maximum angle at which the display screen 114 can be viewed by a user where visual output with respect to hues, contrast, etc. as defined by, for example, manufacturer specifications is adequate. In some examples, the display FoV 208 for the display screen 114 is based on a size of the display screen 114, the type of display screen 114 (e.g., LCD), a curvature of the display screen 114, etc. In the example of FIG. 2, the user 106 is present and located in the center of the imaging FoV 202 and focused on the display panel 102 with no head turn 214 (e.g., 0°). In some examples, the user 106 may be focused on the display screen 114 with a head turn within the left and right boundaries 210, 212 of the display FoV 208. In some examples, the user 106 may be positioned in the center of the display FoV 208 and turn his or her head past the left or right boundaries 210, 212 (e.g., greater than 45°) of the display FoV 208 but still be within a threshold angle range (e.g., 90°) on the either side. In the illustrated example, the line 216 represents a head turn of the user 106 to the right past the left display FoV boundary 210 but within the threshold. Similarly, the line 218 represents a head turn of the user 106 to the left past the right display FoV boundary 212 but within the threshold. In other examples, the user may turn his or her head past the left and right thresholds 216, 218 (e.g., at an angle greater than 90°) to face a region 220. For example, the user 106 may turn around to speak to someone behind them or walk away from the user device 104, thus leaving the display FoV 208 and/or imaging FoV 202.

In the example of FIG. 2, the display panel controller 124 processes image data generated by the image sensor(s) 118 to determine whether the user 106 is present within the imaging FoV 202 to control display characteristics including the backlight 116 of the display screen 114. Additionally or alternatively, the display panel controller 124 controls panel electronics 120 of the display panel 102 cause other changes to other device characteristics (e.g., a change in fan speed, a volume, etc.). Thus, example display panel controller 124 provides a means for controlling operation of the display panel 102 and, as such, reducing power consumption by the display panel 102 during periods of user inactivity at the user device 104.

In some examples, the display panel controller 124 may execute one or more learned models (e.g., machine learning) to determine a presence of the user 106 within the imaging FoV 202 and/or a gaze of the user 106 within the display FoV 208 based on the image data generated by the image sensor(s) 118. In some examples, the learned models include learned user-presence model(s) and/or learned face detection model(s). As shown in FIG. 2. a training manager 222 can employ one or more algorithms (e.g., machine learning algorithms, etc.) to detect and recognize user presence (e.g., whether a user is present in the imaging FoV), and/or a user's orientation (e.g., facial orientation) relative to the display FoV to identify a direction of the user's head and/or face. The training manager 222 communicates with a training image database 224 containing image data including human facial feature(s) such as, for example, mouths, noses, ears, etc.) positioned at different angles. In some examples, the training manager 222 uses the learned user-presence model(s) to determine if the user 106 is present within the imaging FoV 202. Additionally or alternatively, the training manager 222 uses the learned face detection model(s) to determine a direction that the user is facing within the display FoV 208. Based on the detection of the user 106 in the imaging FoV 202 and/or a user's facial orientation in the display FoV 208, the display panel controller 124 controls backlight 116 of the display panel 102 and the panel electronics 120.

The display panel controller 124 applies one or more correlation rules and/or misprediction rules to apply selective adjustment of one or more display characteristics including, for example, dimming of the backlight 116 of the display screen 114 to reduce power consumption of the display panel 102 of the user device 104. The display panel controller 124 does not rely only on data collected by the image sensor(s) 118 to identify user presence and selectively dim the backlight 116 of the display screen 114 because such data may be error-prone and inaccurate based on limitations of image sensor(s). In the examples disclosed herein, the display panel controller 124 implements the correlation rule(s) to correlate user presence and user engagement with the user device 104. Use of the correlation rule(s) enables the display panel controller 124 to prevent dimming of the backlight 116 prematurely. As such, based on the data generated by the image sensor(s) 118 and the user input detection sensor(s) 109, the display panel controller 124 can instruct the backlight 116 to stay fully lit and/or maintain a level of brightness until the display panel controller 124 determines that the user 106 is disengaged with the user device 104 and/or not present. In some examples, display panel controller 124 implements the misprediction rule(s) to infer user 106 intent (e.g., an action) to further prevent premature dimming of the display screen 114 and/or cause the display screen 114 to return to a default or maximum brightness.

Figure 3:
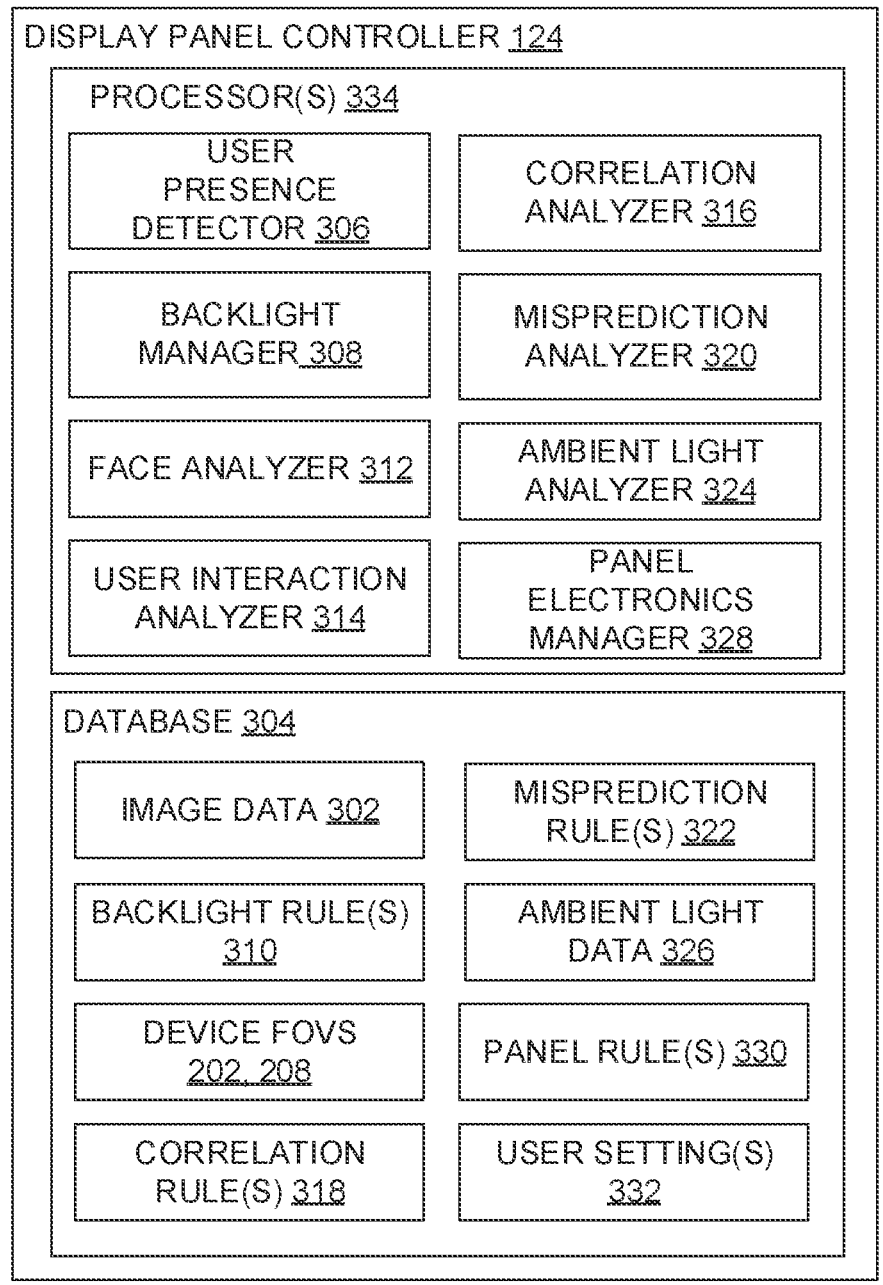
FIG. 3 is a block diagram of an example implementation of the display panel controller of FIG. 1.

FIG. 3 is a block diagram of an example implementation of the display panel controller 124 of FIG. 1. As disclosed in connection with FIGS. 2-3, the example display panel controller 124 is structured, constructed, and/or programmed to manage power consumption by a display panel (e.g., the display panel 102 of FIG. 1) of a user device (e.g., the user device 104 of FIG. 1) by adjusting one or more characteristics of the display and/or device. For example, the display panel controller 124 may adjust a backlight (e.g., the backlight 116 of FIG. 1) and panel electronics (e.g., the panel electronics 120 of FIG. 1) of the display panel based on use-presence and/or attentiveness relative to a display screen (e.g., the display screen 114 of FIG. 1) of the user device and/or engagement of the user with the user device. The display panel controller 124 receives example image data 302 from the image sensor(s) 118 (e.g., a front-facing camera) of the user device 104 of FIG. 1. The image data 302 represents objects within the example imaging FoV 202 of the image sensor(s) 118 shown in FIG. 1. In some examples, the image sensor(s) 118 of FIG. 1 are always-on sensors and, thus, can generate image data 302 when the user device 104 is in a powered-on state, including a sleep mode.

As shown in FIG. 3, the example display panel controller 124 includes an example database 304. In some examples, the database 304 is located external to the display panel controller 124 as is communicatively coupled to the display panel controller 124. The example database 304 of FIG. 3 stores the image data 302 generated by the image sensor(s) 118. The database 304 stores data related to the imaging FoV 202 and the display FoV 208 as well as other data as disclosed herein. In some examples, the data related to the imaging FoV 202 and the display FoV 208 is provided based on specifications of the image sensor(s) 118 (e.g., resolution, etc.) as well as the display screen 114 (e.g., size, a field of view, a curvature, etc.).

As shown in FIG. 3, the example display panel controller 124 includes an example user-presence detector 306 to analyze the image data 302 to identify a presence of a user 106 in the imaging FoV 202. In some examples, the user-presence detector 306 uses machine learning models generated by the training manager 222 to identify whether a user 106 is present in the imaging FoV 202. In other examples, the user-presence detector 306 does not use machine learning models but uses other techniques (e.g., programmed instructions, etc.) to determine user presence. In examples in which the user-presence detector 306 does not identify a user 106 present in the imaging FoV 202, the user-presence detector 306 instructs an example backlight manager 308 to selectively dim or fully turn off the backlight 116. In some examples, the backlight manager 308 turns off the backlight 116 sooner than would occur if operation of the display panel 102 was controlled by the timeout period of user inactivity (e.g., after 15 minutes) based on the user device 104. As such, the display panel controller 124 can reduce power consumption of the user device 104 by controlling the display panel 102 based on the presence or absence of the user 106 relative to the user device 104 (e.g., within the imaging FoV 202).

In some examples, the user-presence detector 306 determines that the user 106 is present within the imaging FoV 202. In such examples, the user-presence detector 306 instructs the backlight manager 308 to turn on the backlight 116. In some examples, the backlight manager 308 is instructed to turn on the backlight 116 to a default brightness setting (e.g., a brightness level set by a manufacturer of the device or the user). As such, the backlight manager 308 generates and transmits the instruction(s) for the backlight 116 based one or more example backlight rules 310 stored in the database 304. In some examples, the backlight rule(s) 310 define a brightness level (e.g., a lumen measurement) to be output by the backlight 116. In some examples, the backlight rule(s) 310 define a dimming rate of the backlight 116 (e.g., dim backlight by 20% every second until 0%). In other examples, the backlight rule(s) 310 can identify if the panel electronics 120 are turned off (e.g., when the user 106 is not present), and to indicate that the backlight 116 should also be turned off.

As shown in FIG. 3, the example display panel controller 124 includes an example face analyzer 312. In the example of FIG. 3, if the user-presence detector 306 identifies the user 106 in the imaging FoV 202, the user-presence detector 306 instructs the face analyzer 312 to analyze the image data 302 to determine a facial orientation of the user 106. For example, the face analyzer 312 determines the direction at which the user is facing in the display FoV 208. If the user-presence detector 306 determines that the user 106 is not within the imaging FoV 202, the user-presence detector 306 instructs the face analyzer 312 to refrain from analyzing image data 302 to reduce power consumption. In such examples, the user-presence detector 306 has determined that the user 106 is not present relative to the user device 104 of FIG. 1.

In some examples, the face analyzer 312 uses machine learning models generated by the training manager 222 of FIG. 2 to analyze one or more facial features (e.g., an ear, a nose, a mouth, etc.) of the user 106 in the image data 302 to determine if the user 106 is present in the display FoV 208. If face analyzer 312 determines that the user 106 is in the display FoV 208, the face analyzer 312 analyzes one or more characteristics (e.g., one ear is visible, both eyes are visible, back of the head is visible, etc.) of the facial features to determine the orientation, and thus, an angle of gaze of the user 106 in the display FoV 208 relative to the image sensor(s) 118. For example, the face analyzer 312 can determine that the user 106 is substantially facing the image sensor(s) 118 (e.g., looking directly at the center of the display screen 114 or within the display FoV 208) or that the user 106 has his or her head at an angle outside of the display FoV 208. Based on the position of the user (e.g., an angle of a facial feature), the face analyzer 312 determines whether the user 106 is focused on the display screen 114 or is non-attentive relative to the user device 104. As such, the face analyzer 312 identifies a presence of a face of the user 106 relative to the image sensor(s) 108 of the display screen 114.

In some examples, based on the data generated by the face analyzer 312, the display panel controller 124 determines that the user 106 is facing the image sensor(s) 118, and the backlight rule(s) 310 can indicate that a brightness of the backlight 116 should be adjusted to a default brightness setting (e.g., a maximum brightness). In some examples, the level of brightness may be correlated to an angle of the user's face. In some examples, in response to the face analyzer 312 determining that the user's face is directed between the left and right boundaries 210, 212 of the display FoV 208 at a first angle (e.g., the user's face is angled between about 30°-45° relative to a center aligned with the image sensor(s) 118), the backlight rule(s) 310 can indicate that brightness of the backlight 116 should decrease. For example, the backlight rule(s) 310 may indicate a specific amount of brightness decrease. For examples, the backlight rule(s) 310 may indicate a decrease of 50% of a default and/or a maximum brightness. In other examples, other levels of brightness may be indicated by the backlight rule(s) 310. In another example, the face analyzer 312 determines that the user's face is angled within the boundaries 210, 212 of the display FoV 208 by a second angle (e.g., the user's face is angled between about 45°-90° relative to the center aligned with the image sensor(s) 118). The backlight rule(s) 310 can indicate that brightness of the backlight 116 should change by a different amount than when the user's face was angled by the first angle. For example, the backlight rule(s) 310 may indicate that the brightness of the display should decrease to, for example, 90% of the default and/or maximum brightness. In other examples, other levels of brightness may be indicated by the backlight rule(s) 310. In some examples, the face analyzer 312 determines that the user's face is directed 90° or more away from the image sensor(s) 118, the backlight rule(s) 310 can indicate that the backlight 116 can be turned off because the display screen 114 is not in the user's field of view. In these examples, the backlight manager 308 of the example display panel controller 124 decreases the brightness of the display by a greater amount as the angle of the user's face relative to a center of the user device 104 increases. The backlight rule(s) 310 define different levels of backlight 116 brightness based on the determination of the direction of the user's face and gaze by the face analyzer 312.

In some examples, the backlight rule(s) 310 define a rate of selective adjustment (e.g., dimming) rather than a backlight 116 level. For example, if the face analyzer 312 determines that a face of the user 106 is at an angle past at least one of the boundaries of the display FoV 210, 212 relative to the image sensor(s) 118, the backlight manager 308 may apply selective adjustment (e.g., dimming) after a period of time to reduce the backlight 116 of the display screen 114 by a rate. For example, the backlight manager 308 may start to dim the display after 5 seconds by 5% per 1 second until backlight is 20% of maximum level. In some examples, the backlight manager 308 may delay adjusting the display characteristic(s) for a different period of time. In some examples, the backlight manager 308 may adjust the display characteristic(s) at a different rate and/or at a variable and/or dynamically changing rate. In some examples, the backlight manager 308 may adjust the display characteristic(s) until a different level is achieved. In such examples, the user device 104 reduces power consumption while the user 106 is present in the imaging FoV 202 but not attentive with respect to the display screen 114.

In other examples, the face analyzer 312 determines that the user 106 is present within the display FoV but does not identify any facial features in the image data 302. For example, the face analyzer 312 determines that the user is positioned beyond the left and right thresholds 216, 218 of FIG. 2 (e.g., at an angle greater than 90° relative to the center of the user device 104) to face the region 220. In this position, the user may be oriented in a direction opposite the image sensor(s) 118. In such examples, the face analyzer 312 instructs the backlight manager 308 to apply selective adjustment (e.g., dimming) to the backlight 116 after a longer period of time, at an increased rate, to a more reduced level, and/or to turn off to reduce power consumption more aggressively because the user 106 is not looking at the display screen 114, despite the user being present within the display FoV 208. For example, when the user's face is angled greater than 90° relative to the center of the user device 104, the backlight manager 308 may begin to adjust the display characteristic(s) after 15 seconds. In some examples, the backlight manager 308 may dim the backlight 20% per second. In some examples, the backlight manager 308 may dim the backlight until the backlight is turned off. In other examples, other timing, rate, and/or level values may be used.

In some examples, the rate at which the backlight manager 308 selectively dims the backlight 116 is based on the orientation of the user is predefined by the manufacturer of the user device 104. The selective adjustment (e.g., dimming) rates (e.g., 5% per second until 20%, 20% per second until 0%, etc.,) can be based on prior activity of the user and/or prior activity of one or more other user(s) of the user device 104 and/or of other user device(s). In some examples, the selective adjustment (e.g., dimming) rates can be adjusted.

As shown in FIG. 3, the example display panel controller 124 includes an example user interaction analyzer 314. The example user interaction analyzer 314 identifies how and when the user 106 interacts with the user device 104 based on the data generated by the user input detection sensor(s)

109. For example, the user interaction analyzer 314 identifies a movement and/or a click of a mouse, a pressing of a key on a keyboard, a speaker volume adjustment, and/or a touching of a trackpad, etc. In response to identifying a user interaction with the user device 104, the user interaction analyzer 314 instructs the backlight manager 308 to maintain backlight 116 illumination setting because the user 106 is actively engaged with the user device 104. In some examples, when the user 106 is engaged with the user device 104, the backlight is kept at a default level. In some examples, when the user 106 is engaged with the user device 104, the backlight is kept at a maximum level.

In some examples, the user 106 stops interacting with the user device 104 via the input device(s) 108 for a period of time. When the period of time in which no user inputs are detected matches a predetermined timeout period set by the manufacturer of the user device 104, the user interaction analyzer 314 instructs the backlight manager 308 to selectively dim or turn off the backlight 116 of the display screen 114 to reduce power consumption of the user device 104 because the user is no longer actively engaged with the user device 104. When the user 106 returns to the user device 104 and presses a key on the keyboard, moves the mouse, and/or otherwise engages with the user device 104 the display panel 102 reawakens. The user interaction analyzer 314 identifies the interaction event and instructs the backlight manager 308 to return the backlight 116 to a default brightness, the prior brightness, and/or another brightness level. In some examples, the user interaction analyzer 314 analyzes data generated by the user input detection sensor(s) 109 in real time as the user device 104 operates.

As shown in FIG. 3, the example display panel controller 124 includes an example correlation analyzer 316. The correlation analyzer 316 determines whether selective adjustment of the backlight 116 of the display screen 114 or other characteristic(s) of the user device 104 based should be applied based on one or more example correlation rule(s) 318. The correlation rule(s) 318 correlate user interaction events occurring during a period of time and user-presence with selective adjustment of the backlight 116 (and/or adjustment of other device characteristics).

FIG. 4 is a table of example correlation rule(s) 318 as implemented by the example correlation analyzer 316 of FIG. 3. As disclosed in connection with FIG. 3, the user-presence detector 306 detects the presence of the user 106 within the imaging FoV 202. The face analyzer 312 determines if the user 106 is within the display FoV 208 and the orientation of the user 106 relative to the image sensor(s) 118. If the user 106 is identified by both the user-presence detector 306 and the face analyzer 312, the correlation analyzer 316 determines that the user 106 is detected and attentive relative to the user device 104, which define the user detected criteria 400 of the correlation rules 318. In instances where the user 106 is not identified by the user-presence detector 306 or the face analyzer 312 determines that the user is not attentive to the display screen 114, the correlation analyzer 316 is not certain as to whether the user 106 is present or detected. The user not detected criteria 402 of the correlation rules 318 is defined by the correlation analyzer 316 not positively detecting the user.

In the example display panel controller 300 of FIG. 3, the user interaction analyzer 314 identifies, based on the data generated by the user input detection sensor(s) 109, whether the user 106 is engaged with the user device 104 during a timeframe (e.g., 5 minutes, 10 minutes, etc.). User interaction event(s) detected criteria 404 of the correlation rules 318 is defined to cover the user interaction analyzer 314 detecting user input. In such examples, the correlation analyzer 316 is certain that the user 106 was actively engaged with the user device 104 during the period of time. A no user interaction event(s) detected criteria 406 of the correlation rules 318 is defined to cover when the user interaction analyzer 314 does not detect user input (e.g., typing, movement of a mouse, etc.,) during a period of time. With a no user interaction event, the correlation analyzer 316 is not certain whether the user 106 was actively engaged with the user device 104 during the period of time.

As shown by FIG. 4, a positive correlation 408 is defined when the user is detected 400 and when user interaction event(s) are detected 404 during the period of time. The positive correlation 408 indicates that the user 106 is both present relative to the user device 104 and interacting with the device during the period of time. As such, the correlation analyzer 316 can be certain that display panel controller 124 is accurately detecting the user 106 and identifying the behavior of the user 106. In examples when the correlation analyzer 316 identifies the positive correlation 408, the correlation analyzer 316 instructs the backlight manager 308 to apply selective adjustment (e.g., dimming) to the backlight 116 at a rate (e.g., conservative dimming rate, aggressive dimming rate, etc.,) based on a change in user behavior that is identified (e.g., the user turns his or her head between 45°-90°, the user leaves the display FoV 208 or the imaging FoV 202, etc.) to conserve power. In other examples, upon determining a positive correlation 408, the correlation analyzer 316 causes an operating characteristic to be adjusted such as a display refresh rate, a fan activity (e.g., speed), a volume, etc. Otherwise, as disclosed herein, a negative correlation between user detection and user interaction detection indicates that the correlation analyzer 316 cannot accurately analyze user behavior based on the conditions. There are different types of negative correlations disclosed herein. With a negative correlation, the correlation analyzer 316 should not instruct the backlight manager 308 to apply selective adjustment of the backlight 116 of the display screen 114. As such, the correlation analyzer 316 provides a means to improve accuracy at which selective adjustment of display brightness is applied to the display panel 102.

As shown in FIG. 4, the correlation analyzer 316 identifies a negative correlation 410 when the user 106 is not detected 402 in the imaging FoV 202 and/or the display FoV 208 but when user interaction event(s) are detected 404. In such examples, the correlation analyzer 316 cannot accurately determine user behavior or presence based only on the detected interaction events as the user is not present. In such examples, the correlation analyzer 316 does not instruct the backlight manager 308 to selectively adjust the backlight 116 of the display screen 114 and/or other characteristic(s) of the device 104.

As shown in FIG. 4, the correlation analyzer 316 identifies a negative correlation 412 when the user 106 is detected 400 in the imaging FoV 202 or the display FoV 208 but when no user interaction event(s) are detected 406. In such examples, the correlation analyzer 316 cannot accurately determine user behavior based only on the presence of the user when no interaction events were detected for a period of time. In such examples, the correlation analyzer 316 does not instruct the backlight manager 308 to selectively adjust the backlight 116 of the display screen 114 and/or other characteristic(s) of the device 104 as the user 106 may be present relative to the user device 104 but not engaged with the user device 104 during the period of time.

As shown in FIG. 4, the correlation analyzer 316 identifies a negative correlation 414 when the user 106 is not detected 402 in the imaging FoV 202 or the display FoV 208 and when no user interaction event(s) are detected 406. In such examples, the correlation analyzer 316 cannot accurately determine user behavior and thus does not instruct the backlight manager 308 to selectively adjust the backlight 116 of the display screen 114 and/or other characteristic(s) of the device 104.

The example display panel controller 300 of FIG. 3. includes an example misprediction analyzer 320. The misprediction analyzer 320 applies one or more example misprediction rules 322 to stop, slow, or reverse selective adjustment (e.g., dimming) of the backlight 116 or other characteristic(s) of the device 104 in response to a detected user interaction event. Thus, the misprediction analyzer 320 supplements the correlation analyzer 316 when the correlation analyzer 316 incorrectly predicts the absence of the user 106 and/or of user engagement and selective adjustment of the backlight 116 or other characteristic adjustment was applied. For example, if the correlation analyzer 316 identifies a positive correlation 408 and causes the backlight manager 308 to apply selective adjustment of the backlight 116 at a rate after a period of time but the user 106 intends to stop the selective adjustment, the user 106 causes an interaction event (e.g., a movement of the mouse, a touch on a trackpad, a press of a key on a keyboard, etc.,) to cause the brightness adjustment to stop and cause the backlight 116 to return to the default and/or prior brightness. In such examples, after the user interaction analyzer 314 identifies an interaction event indicating that the selective adjustment be stopped or cutoff, the misprediction analyzer 320 instructs the backlight manager 308 to cause the backlight 116 to return to the default brightness, the prior brightness level or setting, and/or another brightness level or setting. As such, the misprediction analyzer 320 provides a means to indicate that selective adjustment was prematurely or incorrectly applied by the correlation analyzer 316 even though the user 106 was present relative to the user device 104. The misprediction analyzer 320 overrides the actions (e.g., display adjustment) caused by the correlation analyzer 316 to disable the display adjustment.

In some examples, the misprediction analyzer 320 causes the correlation analyzer 316 to instruct the backlight manager 308 to apply selective adjustment of the backlight 116 at progressively later time each time selective adjustment (e.g., dimming) is interrupted or stopped by an interaction event. For example, when the correlation analyzer 316 first detects a positive correlation 408 and causes selective adjustment of the backlight 116 based on the predefined rate after a period of time (e.g., 5 seconds) but then a user interaction event interrupts the selective adjustment, the misprediction analyzer 320 can instruct the correlation analyzer 316 to apply the selective adjustment at a later time (e.g., 20 seconds). Subsequently, when the correlation analyzer 316 identifies a positive correlation 408 and the user 106 causes an interaction event during selective adjustment to stop the selective adjustment, the misprediction analyzer 320 again increases the delay at which the selective adjustment is applied. In some examples, the delay at which selective adjustment is applied can be increased by the misprediction analyzer 320 up to a threshold number of times (e.g., four times). Thus, the misprediction analyzer 320 infers user intent to prevent the user 106 from having to invoke an input to indicate his or her presence each time selective adjustment is erroneously applied.

In some examples, if the correlation analyzer 316 incorrectly applies selective adjustment a threshold number of times and the misprediction analyzer 320 has met the number of times in which the misprediction analyzer 320 has extended the delay of applying selective adjustment, the misprediction analyzer 320 disables the correlation analyzer 316 from applying the selective adjustment for a period of time (e.g., until the user device 104 is restarted, etc.) or permanently. As such, the misprediction analyzer 320 inhibits the application of the selective adjustment during a subsequent determination(s) of a positive correlation 408 by the correlation analyzer 316 to prevent another incorrect application.

Figure 5:
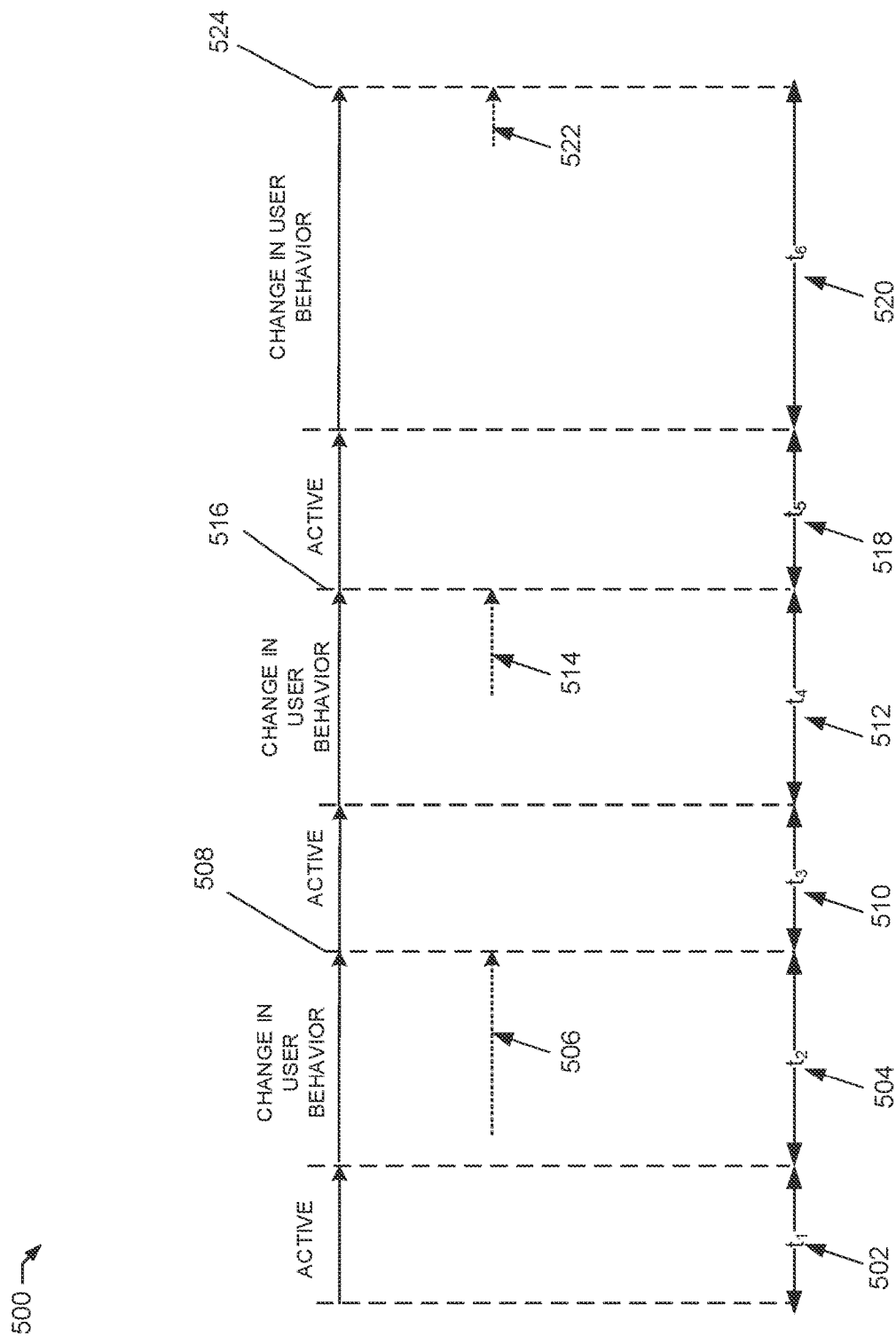
FIG. 5 is a diagram representing operation of the example display panel controller of FIGS. 1 and/or 3.

FIG. 5 is a diagram representing operation of the example display panel controller 124 of FIG. 3. As shown by FIG. 5, the user 106 uses and interacts with the user device 104 for a period of time 500. During a first time interval 502, the user 106 is actively engaged with the user device 104 (e.g., typing, scrolling, watching, etc.). During a second time interval 504, the correlation analyzer 316 may identify a positive correlation 408 between user interaction event(s) 404 and a detected user 400 and instruct the backlight manager 308 to apply selective adjustment (e.g., dimming) 506 at a predetermined rate (e.g., dim backlight 5% every second until 20% backlight) based on the change in user behavior detected (e.g., the user turns his or her head between 45° and 90° away from a center of the user device 104). In some examples, the selective adjustment (e.g., dimming) 506 is applied at a predetermined time after the change in user behavior is detected (e.g., 5 seconds) by the face analyzer 312.

In some examples, the user 106 notices that the display screen 114 is being dimmed even though he or she is present in the imaging FoV 202 and display FoV 208 and invokes an input 508 at an input device(s) 108 to indicate that he or she is present and active thereby disabling the selective adjustment. During this time, the user interaction analyzer 314 monitors for a user input. By disabling the selective adjustment with an input, the backlight manager 308 instructs the backlight 116 to return to a default, maximum, and/or prior brightness. In examples in which a characteristics other than brightness is adjusted, the backlight manager 308 instructs the return of the characteristics to a prior and/or default level.

During a second time interval 510, the user 106 may resume engagement with the user device 104. After a period of time during use of the user device, the user 106 may once again change his or her behavior 512 to indicate to the correlation analyzer 316 to apply selective adjustment (e.g., dimming) at a predetermined rate. Based on the previous input event 508, the misprediction analyzer 320 instructs the backlight manager 308 to delay the selective adjustment (e.g., dimming) 514 to be applied at a later time (e.g., 20 seconds) than the first time the selective adjustment (e.g., dimming) 506 was applied to predict user intent and avoid premature backlight adjustment. In other words, the backlight manager 308 may delay selective adjustment for a first time period at a first time and, after correction by the misprediction analyzer 320, the backlight manager 308 delays selective adjustment for a second time period at a second time after the first time. The second time period being longer than the first time period.

In some examples, the user 106 notices that the display screen 114 is being dimmed once again prompting him or her to invoke an input 516 at the input device(s) 108 to indicate that he or she is present and active. Thus, by invoking the input 516, the user disables the selective adjustment (e.g., dimming) causing the backlight manager 308 to return the backlight 116 brightness back to the default, maximum, and/or prior setting.

During a third time interval 518, the user 106 may resume engagement with the user device 104. After a period of time during use of the user device, the user 106 may once again change his or her behavior 520 (e.g., leave the room, turn to speak to someone behind them) to indicate to the correlation analyzer 316 to apply selective adjustment (e.g., dimming) at a predetermined rate based on the behavior. Based on the previous input event 516, the misprediction analyzer 320 instructs the backlight manager 308 to delay the time at which selective adjustment (e.g., dimming) 522 is applied at an even later time than the previous time the selective adjustment (e.g., dimming) 514 was applied. The user can once again invoke an input 524 to disable the selective adjustment (e.g., dimming) 522 and cause the backlight 116 to return to the default brightness. In some examples, subsequent selective adjustment periods are delayed by progressively longer delay time periods based on repeated mispredictions. In some examples, the rate of the adjustment correlates to the period of delay. For example, a longer period of onset prior to delay may correlate with a faster rate of adjustment.

As shown FIG. 3, the example display panel controller 124 includes an example ambient light analyzer 324 to analyze ambient light data 326 collected by the ambient light sensor(s) 122 with respect to a brightness of the surrounding environment. Based on the analysis of the ambient light data 326, the backlight manager 308 can apply the backlight rule(s) 310 indicative of a rate at which the backlight 116 should be dimmed or brightened to account for, for instance, an increased sensitivity of the user 106 to changes in brightness in a dark environment and/or to improve visibility of the display screen 114 in a bright environment.

As shown by FIG. 3, the example display panel controller 124 includes an example panel electronics manager 328. The panel electronics manager 328 uses one or more example panel rule(s) 330 that are transmitted to the panel electronics 120 of the display panel 102 of FIG. 1 to control operation of the panel electronics 120 of the display panel 102 based on data collected by the user input detection sensor(s) 109 and image sensor(s) 118. The panel electronics manager 328 transmits the instruction(s) to the panel electronics 120 via one or more wired or wireless connections to adjust display panel 102 volume, a display panel 102 fan speed, and/or a display panel 102 refresh rate, for example.

As shown by FIG. 3, the example display panel controller 124 includes one or more example user setting(s) 332. The user setting(s) 332 define user preferences with respect to brightness levels for the backlight 116, backlight 116 dimming rates when the user 106 looks away from the image sensor(s) 118, default operation settings (e.g., volume, fan speed, display panel refresh rate, etc.,) etc. Thus, the examples disclosed may use the user preferences for determining adjustment settings and/or levels.

As shown by FIG. 3, the example display panel controller 124 includes one or more example processors 334 to execute one or more of the example user-presence detector 306, backlight manager 308, face analyzer 312, user interaction analyzer 314, correlation analyzer 316, misprediction analyzer 320, ambient light analyzer 324, and panel electronics manager 328. In some examples, each of the example user-presence detector 306, backlight manager 308, face analyzer 312, user interaction analyzer 314, correlation analyzer 316, misprediction analyzer 320, ambient light analyzer 324, and panel electronics manager 328 are implemented by the same processor(s) 334 or in other examples are implemented by a separate processor(s) 334. In some examples, the processor 334 is the same processor 110 of FIG. 1.

While an example manner of implementing the display panel controller 124 of FIG. 1 as illustrated in FIG. 3, one or more of the elements, processes and/or devices illustrated in FIG. 3 may be combined, divided, re-arranged, omitted, eliminated and/or implemented in any other way. Further, the example user-presence detector 306, the example backlight manager 308, the example face analyzer 312, the example user interaction analyzer 314, the example correlation analyzer 316, the example misprediction analyzer 320, the example ambient light analyzer 324, the example panel electronics manager 328, the example processor(s) 334 and/or, more generally, the example display panel controller 124 of FIG. 3 may be implemented by hardware, software, firmware and/or any combination of hardware, software and/or firmware. Thus, for example, any of the user-presence detector 306, the backlight manager 308, the face analyzer 312, the user interaction analyzer 314, the correlation analyzer 316, the misprediction analyzer 320, the ambient light analyzer 324, the panel electronics manager 328, the processor(s) 334 and/or, more generally, the example display panel controller 124 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user-presence detector 306, backlight manager 308, face analyzer 312, user interaction analyzer 314, correlation analyzer 316, misprediction analyzer 320, ambient light analyzer 324, panel electronics manager 328, and the processor(s) 334 is/are hereby expressly defined to include a non-transitory computer readable storage device or storage disk such as a memory, a digital versatile disk (DVD), a compact disk (CD), a Blu-ray disk, etc. including the software and/or firmware. Further still, the example display panel controller 124 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In the illustrated example of FIG. 3, the processor(s) 334 include means processing means for identifying a facial orientation of a user; determining an angle of a face relative to a center of a display and/or electronic device; determining a correlation of a detected user presence, the facial orientation, and a device interaction event; applying and/or disabling a display brightness adjustment rule; applying and/or disabling an operation adjustment rule; and/or adjusting a brightness of a display and/or other operating characteristic. In this example, the processing means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the processor(s) 334 implement the processing means.

Figure 6:
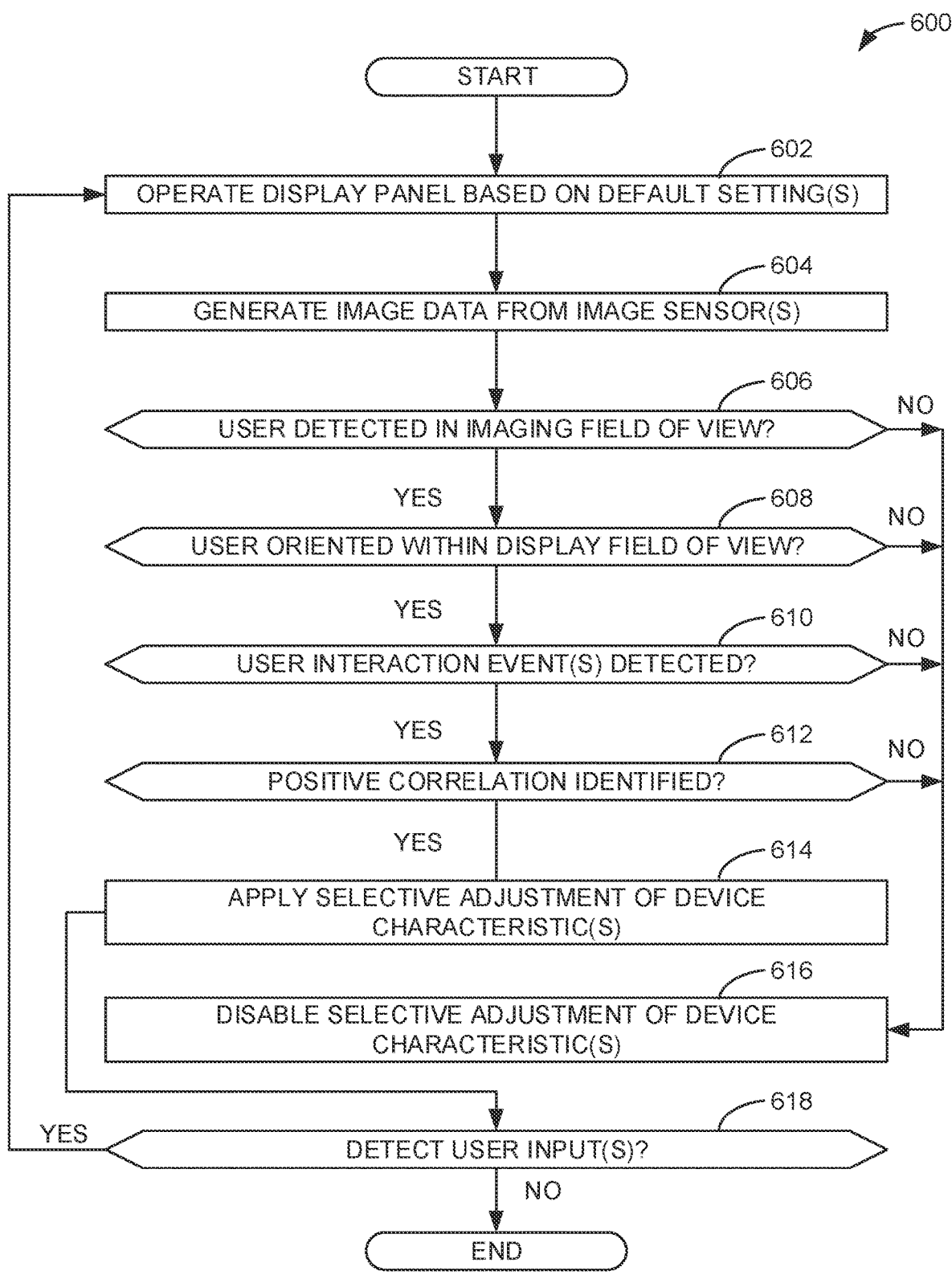
FIG. 6 is a flowchart representative of machine-readable instructions which may be executed to implement the display panel controller of FIGS. 1 and/or 3.

A flowchart representative of example hardware logic, machine readable instructions, hardware implemented state machines, and/or any combination thereof for implementing the display panel controller 124 of FIG. 3 is shown in FIG. 6. The machine readable instructions may be one or more executable programs or portion(s) of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example display panel controller 124 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flowchart of example machine readable instructions that, when executed by a processor, implement the example display panel controller 124 of FIGS. 1 and/or 3. In the example of FIG. 6, the display panel controller 124 generates instruction(s) to control the panel electronics 120 and the backlight 116 of the display panel 102 based on a presence of a user (e.g., the user 106), a gaze direction of the user relative to image sensor(s) (e.g., the image sensor(s) 118) of a user device (e.g., the user device 104), and one or more interaction events with user input devices (e.g., the user input devices 108). The example instructions of FIG. 6 can be executed by one or more processors of, for example, the user device 104, another user device, and/or a cloud-based device. In some examples, at least some of the instructions of FIG. 6 are executed by a processor, such as a digital signal processor, operating in a low power mode to reduce power consumption of the display panel and the user device 104. The instructions of FIG. 6 can be executed in substantially real-time as the image sensor(s) 118 generate image data and/or as a user interacts with the user device 104 via the input devices.

The process 600 includes the display panel 102 operating based on one or more current and/or default settings, including, for example, a current and/or default brightness level (block 602). The image sensor(s) 118 generate image data 302 to be used by the user-presence detector 306 and/or the face analyzer 312 (block 604). The user-presence detector 306 determines if a user is present in the imaging FoV 202 (block 606). If the user-presence detector 306 does not identify a user 106 in the imaging FoV 202, the process 600 proceeds with selective adjustment (e.g., dimming, volume reduction, volume increase, a change in fan speed, etc.) of the display panel 102 characteristics being disabled (block 616).

If the user-presence detector 306 identifies the user 106 in the imaging FoV 202 (block 606), the process 600 proceeds with the face analyzer 312 determining if the orientation of the user 106 is within the display FoV 208 (block 608). If the face analyzer 312 identifies that the user 106 is not oriented within the display FoV 208 (block 608), the process 600 proceeds with the disabling of the selective adjustment (e.g., dimming, volume reduction, volume increase, a change in fan speed, etc.) of the display panel 102 characteristics being disabled (block 616).

If the face analyzer 312 identifies the user 106 is oriented within the display FoV 208 (block 608), the process 600 proceeds with the user interaction analyzer 314 determining if the user input detection sensor(s) 109 generated input data to identify that the user is interacting with the user device 104 (block 610). If the user interaction analyzer 314 does not identify user interaction event(s) with the user device 104 (block 610), the process 600 proceeds with the disabling of the selective (e.g., dimming, volume reduction, volume increase, a change in fan speed, etc.) of the display panel 102 characteristics being disabled (block 616).

If user interaction event(s) are detected by the user interaction analyzer 314 (block 610), the process 600 proceeds with the correlation analyzer 316 determining if there is a positive correlation 408 between user presence 400 and detected user interaction event(s) 404 (block 612). If the correlation analyzer 316 identifies a positive correlation 408 (block 612), the process 600 proceeds with the correlation analyzer 316 instructing the display panel controller 124 to apply selective adjustment (e.g., dimming, etc.) of the display panel 102 characteristics (e.g., backlight 116) to reduce power consumption (block 614). In other examples, the correlation analyzer 316 instructs the panel electronics manager 328 to adjust an operation characteristic of the display panel 102 and/or user device 104 such as one or more of a refresh rate, a volume, a fan speed, etc. If the correlation analyzer 316 does not identify the positive correlation 408 (block 612), the process 600 proceeds with selective adjustment (e.g., dimming, volume reduction, volume increase, a change in fan speed, etc.) of the display panel 102 characteristics being disabled (block 616).

After the correlation analyzer 316 instructs the display panel controller 124 to apply selective adjustment (e.g., dimming, etc.) of the display panel 102 characteristics (e.g., backlight 116) or the panel electronics manager 328 to adjust an operation characteristic of the display panel 102 (block 614), the user interaction analyzer 314 monitors for user interaction event(s) (block 618). If the user interaction analyzer 314 detects user input(s) (block 618), the misprediction analyzer 320 instructs operation of the panel display at the prior or default setting(s) (block 602). For example, the misprediction analyzer 320 instructs the backlight manager 308 to adjust the backlight 116 back to the prior and/or default brightness setting. In this example, the misprediction analyzer 320 interprets that selective adjustment (e.g., dimming) of the display panel 102 was prematurely or incorrectly applied. If no user inputs are detected (block 618), the backlight manager 308 continues to adjust (e.g., dim) the backlight 116 of the display panel 102 and the process 600 ends.

Figure 7:
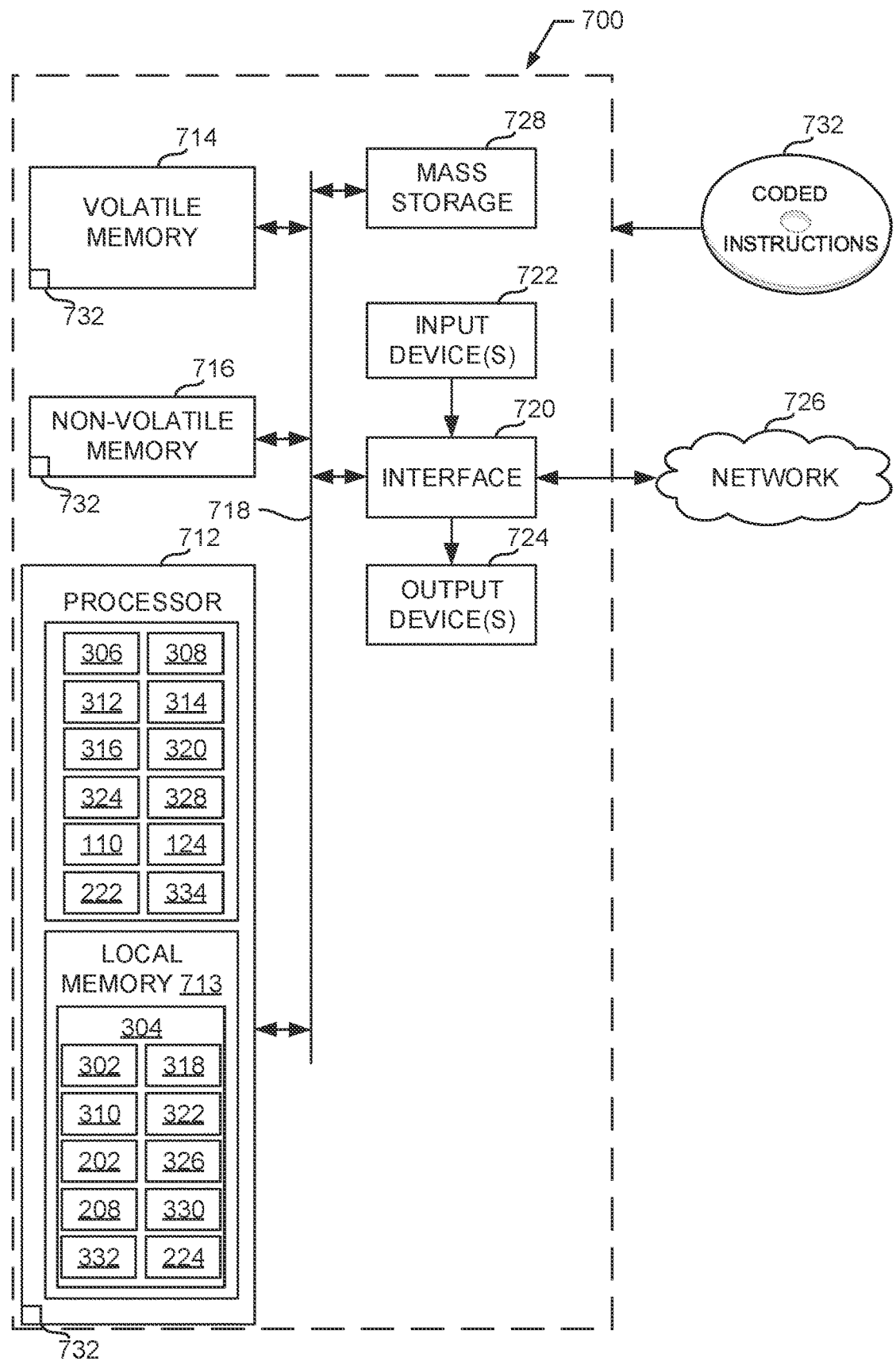
FIG. 7 is a block diagram of an example processing platform structured to execute the instructions of FIG. 6 to implement the display panel controller of FIGS. 1 and/or 3.

FIG. 7 is a block diagram of an example processor platform 700 structured to execute the instructions of FIG. 6 to implement the display panel controller 124 of FIG. 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 712 implements a processor 110, display panel controller 124, training manager 222, user-presence detector 306, backlight manager 308, face analyzer 312, user interaction analyzer 314, correlation analyzer 316, misprediction analyzer 320, ambient light analyzer 324, panel electronics manager 328, and processor(s) 334.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 6 may be stored in the mass storage device 728, in the volatile memory 714, in the non-volatile memory 716, and/or on a removable non-transitory computer readable storage medium such as a CD or DVD.

From the foregoing, it will be appreciated that example systems, methods, apparatus, and articles of manufacture have been disclosed that adjustment characteristics of user devices such as, for example, applying display brightness adjustments at a higher accuracy than traditional techniques to prevent adjusting (e.g., dimming) unless the user is disengaged or not present. The disclosed system, methods, apparatus, and articles of manufacture improve the efficiency of using a computing device by implementing user presence, facial orientation, and user interaction data to determine whether adjustment (e.g., dimming) of a display panel and/or other operating characteristic of a user device should be applied. The disclosed methods, apparatus and articles of manufacture are accordingly directed to one or more improvement(s) in the functioning of a computer such as improving the accuracy in which selective adjustment of device characteristics are applied to reduce power consumption and improve battery life cycle of user devices. For example, examples disclosed herein use correlation and/or misprediction rule(s) to apply selective adjustment of device characteristics, such as dimming of a display when the device is confident that a user is present relative to and engaged with the device to prevent premature or erroneous dimming of the display. Additionally or alternatively, the examples disclosed herein can also be used to decrease the refresh rate of a display panel to reduce power consumption when the user is not engaged with or present relative to the user device or increase the display refresh rate when the user is present and attentive to improve performance of the user device. Examples disclosed herein can also increase accuracy in which device characteristics operate such as a fan or acoustics (e.g., a volume). For example, the disclosed examples can increase fan activity and acoustics when the user is present and attentive to the device and/or decrease fan and acoustic activity when the user become disengaged with the device.

Example methods, apparatus, systems, and articles of manufacture for applying selective adjustment of displays and of operating characteristics of user devices are disclosed herein. Example 1 includes an apparatus to control a brightness of a display of an electronic device, the apparatus including a face analyzer to identify a presence of a face of a user relative to the device based on image data generated by an image sensor of the electronic device, and a correlation analyzer to apply a display brightness adjustment rule to selectively adjust the brightness of the display from a first setting to a second setting after a first time interval based on a correlation of the detected presence of the face and a first device interaction event.

Example 2 includes the apparatus of Example 1 and optionally includes wherein the face analyzer is to identify a facial orientation of the face of the user relative to the display of the device, and the correlation analyzer is to apply the display brightness adjustment rule based on a correlation of the facial orientation and the first device interaction event.

Example 3 includes the apparatus of Examples 1 or 2 and optionally includes a misprediction analyzer to disable the display brightness adjustment rule in response to a second device interaction event.

Example 4 includes the apparatus of Examples 1-3 and optionally includes a backlight manager, wherein in response to disabling of the display brightness adjustment rule, the backlight manager is to adjust the display to the first setting.

Example 5 includes the apparatus of any of Examples 1-4 and optionally includes wherein the face analyzer is to determine an angle of the face relative to a center of the display, and the correlation analyzer is to adjust the brightness of the display at a rate based on the angle.

Example 6 includes the apparatus of any of Examples 1-5 and optionally includes wherein the rate is a first rate of decreasing brightness when the angle is a first angle, and the rate is a second rate of decreasing brightness greater than the first rate when the angle is a second angle greater than the first angle.

Example 7 includes the apparatus of any of Examples 1-6 and optionally includes wherein the correlation is a first correlation and in response to disabling the display brightness adjustment rule, the misprediction analyzer is to cause the display brightness adjustment rule to be applied after a second time interval when a second correlation is identified, the second time interval greater than the first time interval.

Example 8 includes the apparatus of any of Examples 1-7 and optionally includes wherein the correlation is a first correlation and the misprediction analyzer is to increase a delay at which the display brightness adjustment rule is applied for subsequent correlations.

Example 9 includes the apparatus of any of Examples 1-8 and optionally includes wherein in response to disabling the display brightness adjustment rule more than a threshold number of times, the correlation analyzer is disabled to prevent a subsequent application of the display brightness adjustment rule after a subsequent correlation.

Example 10 includes, a non-transitory computer readable media including instructions, which, when executed, cause at least one processor to identify a presence of a face of a user relative to an electronic device based on image data generated by an image sensor of the electronic device, determine a correlation of the detected presence of the face and a first device interaction event, and in response to the correlation, apply a display brightness adjustment rule to selectively adjust the brightness of the display from a first setting to a second setting after a first time interval.

Example 11 includes the non-transitory computer readable media of Example 9 or 10 and optionally includes wherein the instructions are to identify a facial orientation of the face of the user relative to the display of the device, and apply the display brightness adjustment rule based on a correlation of the facial orientation and the first device interaction event.

Example 12 includes the non-transitory computer readable media of Example 9-11 and optionally includes wherein the instructions cause the at least one processor to disable the display brightness adjustment rule in response to a second device interaction event.

Example 13 includes the non-transitory computer readable media of Examples 9-12 and optionally includes wherein to disable the display brightness adjustment rule, the instructions cause the at least one processor to adjust the brightness of the display to the first setting.

Example 14 includes the non-transitory computer readable media of any of Examples 9-13 and optionally includes wherein the instructions cause the at least one processor to determine an angle of a face relative to a center of the display, and adjust the brightness of the display at a rate based on the angle.

Example 15 includes the non-transitory computer readable media of any of Examples 9-14 and optionally includes wherein the rate is a first rate of decreasing brightness when the angle is a first angle, and the rate is a second rate of decreasing brightness greater than the first rate when the angle is a second angle greater than the first angle.

Example 16 includes the non-transitory computer readable media of any of Examples 9-15 and optionally includes wherein the correlation is a first correlation and in response to the disabling of the display brightness adjustment rule, the instructions cause the at least one processor to apply the display brightness adjustment rule after a second time interval when a second correlation is identified, the second time interval greater than the first time interval.

Example 17 includes the non-transitory computer readable media of any of Examples 9-16 and optionally includes wherein the correlation is a first correlation, and the instructions cause the at least one processor to increase a delay at which the display brightness adjustment rule is applied for subsequent correlations.

Example 18 includes the non-transitory computer readable media of any of Examples 9-17 and optionally includes wherein in response to the disabling of the display brightness adjustment rule more than a threshold number of times, the instructions cause the at least one processor to prevent a subsequent application of the display brightness adjustment rule after a subsequent correlation.

Example 19 is a method including identifying, by executing instructions with a processor, a presence of a face of a user relative to an electronic device based on image data generated by an image sensor of the electronic device, determining, by executing instructions with the processor, a correlation of the detected presence of the face and a first device interaction event, and in response to the correlation, applying, by executing instructions with the processor, a display brightness adjustment rule to selectively adjust the brightness of the display from a first setting to a second setting after a first time interval.

Example 20 includes the method of Example 19 and optionally includes a facial orientation of the face of the user relative to the display of the device, and applying the display brightness adjustment rule based on a correlation of the facial orientation and the first device interaction event.

Example 21 includes the method of Example 19 or 20 and optionally includes disabling the display brightness adjustment rule in response to a second device interaction event.

Example 22 includes the method of Examples 19-21 and optionally includes wherein in the disabling of the display brightness adjustment rule includes adjusting the brightness of the display to the first setting.

Example 23 includes the method of any of Examples 19-22 and optionally includes determining an angle of a face relative to a center of the display, and adjusting the brightness of the display at a rate based on the angle.

Example 24 includes the method of any of Examples 19-23 and optionally includes wherein the rate is a first rate of decreasing brightness when the angle is a first angle, and the rate is a second rate of decreasing brightness greater than the first rate when the angle is a second angle greater than the first angle.

Example 25 includes the method of any of Examples 19-24 and optionally includes wherein the correlation is a first correlation, the method further including after the disabling of the brightness adjustment rule during or after the first time interval, applying the display brightness adjustment rule after a second time interval when a second correlation is identified, the second time interval greater than the first time interval.

Example 26 includes the method of any of Examples 19-25 and optionally includes wherein the correlation is a first correlation, the method further including increasing a delay at which the display brightness adjustment rule is applied for subsequent correlations.

Example 27 includes the method of any of Examples 19-26 and optionally including after the disabling of the display brightness adjustment rule more than a threshold number of times, preventing a subsequent application of the display brightness adjustment rule for a subsequent correlation.

Example 28 is an apparatus to control a brightness of a display of an electronic device, the apparatus including memory, and means for processing to identify a presence of a face of a user relative to the device based on image data generated by an image sensor of the electronic device, determine a correlation of the detected presence of the face and a first device interaction event, and apply a display brightness adjustment rule to selectively adjust the brightness of the display from a first setting to a second setting after a first time interval based on the correlation.

Example 29 includes the apparatus of Example 28 and optionally includes wherein the processing means is to identify a facial orientation of the face of the user relative to the display of the device, and apply the display brightness adjustment rule based on a correlation of the facial orientation and the first device interaction event.

Example 30 includes the apparatus of Example 28 or 29 and optionally includes wherein the processing means is to disable the display brightness adjustment rule in response to a second device interaction event.

Example 31 includes the apparatus of Examples 28-30 and optionally includes wherein to disable the display brightness adjustment rule, the processing means is to adjust the brightness of the display to the first setting.

Example 32 includes the apparatus of any of Examples 28-31 and optionally includes wherein the processing means is to determine an angle of the face relative to a center of the display, and the means for processing is to adjust the brightness of the display at a rate based on the angle.

Example 33 includes the apparatus of any of Examples 28-32 and optionally includes wherein the rate is a first rate of decreasing brightness when the angle is a first angle, and the rate is a second rate of decreasing brightness greater than the first rate when the angle is a second angle greater than the first angle.

Example 34 includes the apparatus of any of Examples 28-33 and optionally includes wherein the correlation is a first correlation and in response to disabling the display brightness adjustment rule, the processing means is to cause the display brightness adjustment rule to be applied after a second time interval when a second correlation is identified, the second time interval greater than the first time interval.

Example 35 includes the apparatus of any of Examples 28-34 and optionally includes wherein the correlation is a first correlation and the processing means is to increase a delay at which the display brightness adjustment rule is applied for subsequent correlations.

Example 36 includes the apparatus of any of Examples 28-35 and optionally includes wherein in response to disabling the display brightness adjustment rule more than a threshold number of times, the processing means is to prevent a subsequent application of the display brightness adjustment rule after a subsequent correlation.

Example 37 is an apparatus to adjust an operating characteristic of a computing device the apparatus including at least one memory, instructions, and at least one processor to execute the instructions to identify a presence of a face of a user relative to the device based on image data generated by an image sensor of the computing device, determine a correlation of the detected presence of the face and a first device interaction event, and in response to the correlation, apply an operation adjustment rule to selectively adjust an operating characteristic from a first setting to a second setting after a first time interval.

Example 38 includes the apparatus of Example 37 and optionally includes wherein the at least one processor is to identify a facial orientation of the face of the user relative to the device, and apply the operation adjustment rule based on a correlation of the facial orientation and the first device interaction event.

Example 39 includes the apparatus of Example 37 or 38 and optionally includes wherein the at least one processor is to disable the operation adjustment rule in response to a second device interaction event.

Example 40 includes the apparatus of Examples 37-39 and optionally includes wherein in response to the disabling of the operation adjustment rule, the at least one processor is to adjust the operating characteristic to the first setting.

Example 41 includes the apparatus of any of Examples 37-40 and optionally includes wherein the at least one processor is to determine an angle of the face relative to a center of a display, and adjust the operating characteristics at a rate based on the angle.

Example 42 includes the apparatus of any of Examples 37-41 and optionally includes wherein the rate is a first rate of decreasing a level of the operating characteristic when the angle is a first angle, and the rate is a second rate of decreasing the level of the operating characteristics greater than the first rate when the angle is a second angle greater than the first angle.

Example 43 includes the apparatus of any of Examples 37-42 and optionally includes wherein the correlation is a first correlation and in response to disabling the operation adjustment rule, the at least one processor is to cause the operation adjustment rule to be applied after a second time interval when a second correlation is identified, the second time interval greater than the first time interval.

Example 44 includes the apparatus of any of Examples 37-43 and optionally includes wherein the correlation is a first correlation and the at least one processor is to increase a delay at which the operation adjustment rule is applied for subsequent correlations.

Example 45 includes the apparatus of any of Examples 37-44 and optionally includes wherein in response to disabling the operation adjustment rule more than a threshold number of times, the at least one processor is to prevent a subsequent application of the operation adjustment rule after a subsequent correlation.

Example 46 includes the apparatus of any of Examples 37-45 and optionally includes wherein the operating characteristic is a display brightness.

Example 47 includes the apparatus of any of Examples 37-46 and optionally includes wherein the operating characteristic is a display refresh rate.

Example 48 includes the apparatus of any of Examples 37-47 and optionally includes wherein the operating characteristic is a fan speed.

Example 49 includes the apparatus of any of Examples 37-48 and optionally includes wherein the operating characteristic is a volume level.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A non-transitory computer readable medium comprising instructions to cause at least one processor to:
   identify a face of a user based on image data generated by an image sensor of an electronic device;
   detect an audio input via a microphone;
   identify a presence of the user relative to the electronic device based on the identification of the face;
   identify the presence of the user relative to the electronic device based on the detected audio input;

adjust a display brightness of a display of the electronic device from a first setting to a second setting after at least five seconds based on the identified presence of the user; and
cause dimming of the display brightness based on the identified presence of the user to be suspended during playing of a video.

2. The non-transitory computer readable medium of claim 1, wherein the instructions are to cause one or more of the at least one processor to:
identify a facial orientation of the face of the user relative to the display of the device; and
adjust the display brightness based on the facial orientation.

3. The non-transitory computer readable medium of claim 1, wherein the instructions cause one or more of the at least one processor to suspend adjustment of the display brightness in response to a device interaction event.

4. The non-transitory computer readable medium of claim 3, wherein to suspend adjustment of the brightness of the display, the instructions cause one or more of the at least one processor to adjust the display brightness to the first setting.

5. The non-transitory computer readable medium of claim 1, wherein the instructions cause one or more of the at least one processor to:
determine an angle of the face relative to a center of the display; and
adjust the display brightness at a rate based on the angle.

6. The non-transitory computer readable medium of claim 5, wherein the rate is a first rate of decreasing brightness when the angle is a first angle, and the rate is a second rate of decreasing brightness greater than the first rate when the angle is a second angle greater than the first angle.

7. The non-transitory computer readable medium of claim 1, wherein the audio input is audio from the user.

8. The non-transitory computer readable medium of claim 7, wherein the audio input is a human voice.

9. The non-transitory computer readable medium of claim 1, wherein the instructions cause the at least one processor to:
determine an angle of the face relative to a center of the display; and
adjust the brightness of the display when the angle is at least 45 degrees.

10. The non-transitory computer readable medium of claim 1, wherein the instructions cause the at least one processor to:
determine an eye gaze of the user relative to the display; and
adjust the brightness of the display based on the eye gaze.

11. An apparatus to adjust an operating characteristic of a computing device, the apparatus comprising:
at least one memory;
instructions; and
at least one processor circuit to be programmed by the instructions to:
identify a presence of a face of a user relative to the device based on image data generated by an image sensor of the computing device;
detect an audio input via a microphone;
adjust a brightness of a display of the computing device from a first setting to a second setting after a period of time based on at least one of the detected presence of the face or the detected audio input; and
suspend adjustment of the display brightness during playing of a video.

12. The apparatus of claim 11, wherein one or more of the at least one processor circuit is to:
identify a facial orientation of the face of the user relative to the device; and
adjust the brightness of the display based on the facial orientation.

13. The apparatus of claim 11, wherein one or more of the at least one processor circuit is to suspend adjustment of the brightness of the display in response to a device interaction event.

14. The apparatus of claim 13, wherein in response to the suspending of the adjustment of the brightness of the display, one or more of the at least one processor circuit is to adjust the brightness of the display to the first setting.

15. The apparatus of claim 14, wherein one or more of the at least one processor circuit is to:
determine an angle of the face relative to a center of a display; and
adjust the brightness of the display at a rate based on the angle.

16. The apparatus of claim 15, wherein the rate is a first rate of decreasing brightness when the angle is a first angle, and the rate is a second rate of decreasing brightness greater than the first rate when the angle is a second angle greater than the first angle.

17. The apparatus of claim 13, wherein in response to disabling the adjustment of the brightness of the display more than a threshold number of times, one or more of the at least one processor circuit is to prevent a subsequent adjustment of the brightness of the display.

18. The apparatus of claim 11, wherein one or more of the at least one processor circuit is to adjust a display refresh rate based on at least one of the detected presence of the face or the detected audio input.

19. The apparatus of claim 11, wherein one or more of the at least one processor circuit is to adjust a fan speed based on at least one of the detected presence of the face or the detected audio input.

20. The apparatus of claim 11, wherein one or more of the at least one processor circuit is to adjust a volume level based on at least one of the detected presence of the face or the detected audio input.

21. The apparatus of claim 11, wherein the audio input is audio from the user.

22. The apparatus of claim 11, wherein the audio input is a human voice.

23. The apparatus of claim 11, wherein one or more of the at least one processor circuit is to:
determine an angle of the face relative to a center of the display; and
adjust the brightness of the display when the angle is at least 45 degrees.

24. The apparatus of claim 11, wherein one or more of the at least one processor circuit is to:
determine an eye gaze of the user relative to the display; and
adjust the brightness of the display based on the eye gaze.

25. A non-transitory computer readable medium comprising instructions to cause at least one processor to:
identify a presence of a face of a user relative to an electronic device based on image data generated by an image sensor of the electronic device;
adjust a brightness of a display of the electronic device from a first setting to a second setting after a period of time based on the detected presence of the face; and
after a playing of a video on the display, reassess the presence of the face of the user and readjust the brightness of the display, wherein adjustment of the brightness of the display, which is based on the detected presence of the face, is suspended during the playing of the video.

* * * * *